US010614074B1

(12) United States Patent
Darling et al.

(10) Patent No.: US 10,614,074 B1
(45) Date of Patent: Apr. 7, 2020

(54) SCORING SOCIAL MEDIA CONTENT

(71) Applicant: Tomorrowish LLC, Natick, MA (US)

(72) Inventors: Richard Michael Darling, Natick, MA (US); Todd Dibble, North Grafton, MA (US); Tristan Dix Amzallag, Saratoga Springs, NY (US)

(73) Assignee: Tomorrowish LLC, Framingham, MA (US)

( * ) Notice: Subject to any disclaimer, the term of this patent is extended or adjusted under 35 U.S.C. 154(b) by 860 days.

(21) Appl. No.: 14/318,294

(22) Filed: Jun. 27, 2014

Related U.S. Application Data

(60) Provisional application No. 61/842,199, filed on Jul. 2, 2013.

(51) Int. Cl.
| | | |
|---|---|---|
| *G06F 7/00* | (2006.01) | |
| *G06F 16/2457* | (2019.01) | |
| *G06F 16/31* | (2019.01) | |

(52) U.S. Cl.
CPC ...... *G06F 16/24578* (2019.01); *G06F 16/313* (2019.01)

(58) Field of Classification Search
CPC .................................................. G06F 16/313
USPC .......................................................... 707/750
See application file for complete search history.

(56) References Cited

U.S. PATENT DOCUMENTS

| | | | |
|---|---|---|---|
| 7,657,905 B2 | 2/2010 | Kimoto | |
| 8,561,106 B1 | 10/2013 | Taylor et al. | |
| 9,152,625 B2 * | 10/2015 | Louis | G06F 17/2745 |
| 9,306,989 B1 | 4/2016 | Jayaram | |
| 9,357,242 B2 * | 5/2016 | Sinha | H04N 21/235 |
| 9,544,650 B1 | 1/2017 | Oztaskent | |
| 10,425,671 B2 * | 9/2019 | Archibong | H04L 67/02 |
| 2004/0049498 A1 * | 3/2004 | Dehlinger | G06F 17/2785 |
| 2005/0060745 A1 | 3/2005 | Riedl et al. | |
| 2007/0157237 A1 | 7/2007 | Cordray | |

(Continued)

OTHER PUBLICATIONS

International Search Report and Written Opinion, PCT/US2014/28540, dated Sep. 19, 2014, 12 pages.

*Primary Examiner* — Eliyah S. Harper
(74) *Attorney, Agent, or Firm* — Fish & Richardson P.C.

(57) ABSTRACT

Among other things, a method includes accessing stored social media content, the social media content comprising elements of social media, the social media content associated with data indicating timing information associated with respective elements of social media content, at least some of the timing information expressed as an offset relative to a time associated with a media program associated with the social media content; and for at least one element of social media, determining, for at least some of terms of the element of social media, the frequency of the terms across elements of social media associated with the media program, each term comprising a portion of the element of social media, determining an importance value for at least some of the terms of the element of social media, the importance value indicating the importance of the respective term, based on the frequency of terms determined for the element of social media, and based on the received importance values, determining a frequency value for the element of social media, determining one or more weights for the element of social media, and based on the frequency value and the weights, determining a score for the element of social media.

22 Claims, 25 Drawing Sheets

(56) References Cited

U.S. PATENT DOCUMENTS

| | | |
|---|---|---|
| 2008/0066100 A1 | 3/2008 | Brodersen et al. |
| 2008/0083003 A1 | 4/2008 | Biniak et al. |
| 2008/0088735 A1 | 4/2008 | Biniak et al. |
| 2008/0235727 A1 | 9/2008 | Seong |
| 2009/0132527 A1 | 5/2009 | Sheshagiri et al. |
| 2010/0058417 A1 | 3/2010 | Rondeau et al. |
| 2011/0063503 A1 | 3/2011 | Brand et al. |
| 2011/0137845 A1 | 6/2011 | Ward |
| 2011/0178854 A1 | 7/2011 | Sofer |
| 2011/0179062 A1 | 7/2011 | Lee et al. |
| 2011/0238673 A1* | 9/2011 | Carter ............... G06Q 10/10 707/748 |
| 2012/0203706 A1 | 8/2012 | Teran |
| 2012/0215773 A1 | 8/2012 | Si et al. |
| 2012/0226678 A1 | 9/2012 | Park |
| 2012/0227073 A1 | 9/2012 | Hosein |
| 2012/0254152 A1* | 10/2012 | Park ................... G06Q 30/02 707/710 |
| 2012/0331496 A1 | 12/2012 | Copertino et al. |
| 2013/0036169 A1 | 2/2013 | Quigley |
| 2013/0046826 A1* | 2/2013 | Stanton ............. G06Q 10/10 709/204 |
| 2013/0091117 A1* | 4/2013 | Minh ................ G06F 16/353 707/709 |
| 2013/0091204 A1 | 4/2013 | Loh |
| 2013/0103667 A1* | 4/2013 | Minh .................. H04L 51/32 707/709 |
| 2013/0170819 A1 | 7/2013 | Dykeman |
| 2013/0290859 A1 | 10/2013 | Venkitaraman et al. |
| 2013/0297581 A1* | 11/2013 | Ghosh ............... G06F 16/313 707/706 |
| 2014/0088952 A1* | 3/2014 | Fife .................... G06F 17/27 704/9 |
| 2014/0140679 A1 | 5/2014 | Khader et al. |
| 2014/0181197 A1 | 6/2014 | Baggott |
| 2014/0189540 A1 | 7/2014 | Pead |
| 2014/0201240 A1* | 7/2014 | Andavarapu ........ G06F 16/43 707/771 |
| 2014/0229487 A1 | 8/2014 | Mukund |
| 2014/0280564 A1 | 9/2014 | Darling et al. |
| 2015/0106360 A1 | 4/2015 | Cao |
| 2015/0143405 A1 | 5/2015 | Hogan |
| 2015/0227579 A1* | 8/2015 | Cantarero ......... G06F 16/313 707/708 |
| 2017/0140398 A1 | 5/2017 | Fleischman |

\* cited by examiner

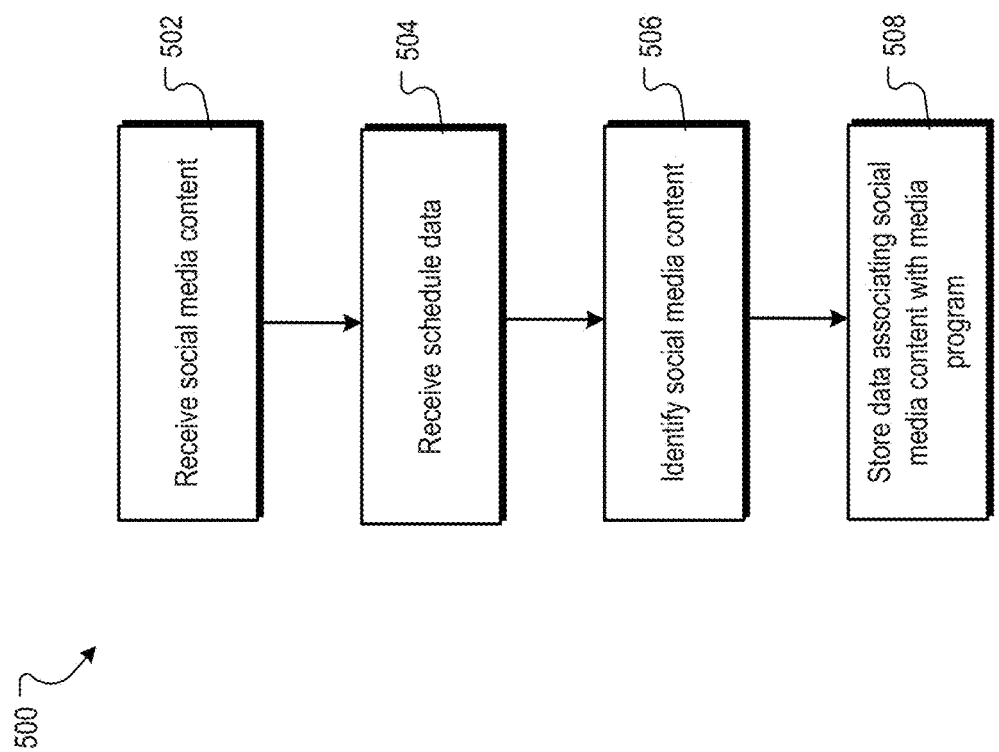

SCORING SOCIAL MEDIA CONTENT

CLAIM OF PRIORITY

This application claims priority under 35 USC § 119(e) to U.S. Patent Application Ser. No. 61/842,199, filed on Jul. 2, 2013, the entire contents of which are hereby incorporated by reference.

FIELD OF TECHNOLOGY

This description relates to scoring social media content.

BACKGROUND

Social media services enable users of the services to author and receive social media content. Social media content is content authored by (or otherwise provided by) users of the social media services and designated to be provided to one or more other users of the social media services. Sometimes the content can be transmitted to users as soon as it is received by a social media service, e.g., in real time. Sometimes the content can be stored and later transmitted to users, a technique sometimes called "playing back" the content.

SUMMARY

In one aspect, in general, a method includes accessing stored social media content, the social media content comprising elements of social media, the social media content associated with data indicating timing information associated with respective elements of social media content, at least some of the timing information expressed as an offset relative to a time associated with a media program associated with the social media content; and for at least one element of social media, determining, for at least some of terms of the element of social media, the frequency of the terms across elements of social media associated with the media program, each term comprising a portion of the element of social media, determining an importance value for at least some of the terms of the element of social media, the importance value indicating the importance of the respective term, based on the frequency of terms determined for the element of social media, and based on the received importance values, determining a frequency value for the element of social media, determining one or more weights for the element of social media, and based on the frequency value and the weights, determining a score for the element of social media.

Implementations can include one or more of the following features. The frequency of the terms is determined according to the total number of elements of social media associated with the media program and number of elements of social media that contain the term. The frequency of the terms is determined according to the formula log 2(M/T), wherein log 2 is the logarithm base 2 function, M is the total number of elements of social media associated with the media program, and T is the number of elements of social media that contain the term. The method includes separating the social media message into words, wherein the terms comprise the words. A frequency of at least one of the words is determined based on a database that stores words and their associated frequencies. The score is determined at least in part by multiplying the frequency value by one or more of the weights. The method includes increasing the score based on the presence of one or more keywords in the element of social media, the keywords stored in a keyword database. The method includes calculating a score of zero for the element of social media based on a weight determined by the presence of banned words in the element of social media. Determining the one or more weights for the element of social media includes determining if the element of social media is associated with at least a threshold number of search terms, and assigning, to the element of social media, a weight that increases the score relative to messages that are not associated with at least the threshold number of search terms. At least one weight is determined based on a number of reposts of the element of social media. At least one weight is determined based on a number of affirmations of the element of social media. At least one weight is determined based on a popularity of a user associated with the element of social media. At least one weight is determined based on a URL contained in the element of social media. The method includes normalizing the determined scores for the elements of social media. Normalizing the scores includes converting the scores to a range from 0 to 100 percent. The method includes determining, based on the respective scores of the elements of social media, at least some of the elements of social media to include in a stream of social media, and displaying, on a user interface, at least some of the determined elements of social media. At least some of the elements of social media are determined based on an identity of a user associated with the social media stream.

These and other aspects, features, and implementations, and combinations of them, may be expressed as apparatus, methods, means or steps for performing functions, components, systems, program products, and in other ways.

Other aspects, features, and advantages will be apparent from the description and the claims.

DESCRIPTION OF FIGURES

FIGS. 5A, 5B, and 5C show flowcharts.

DETAILED DESCRIPTION

Overview

Figure 1:
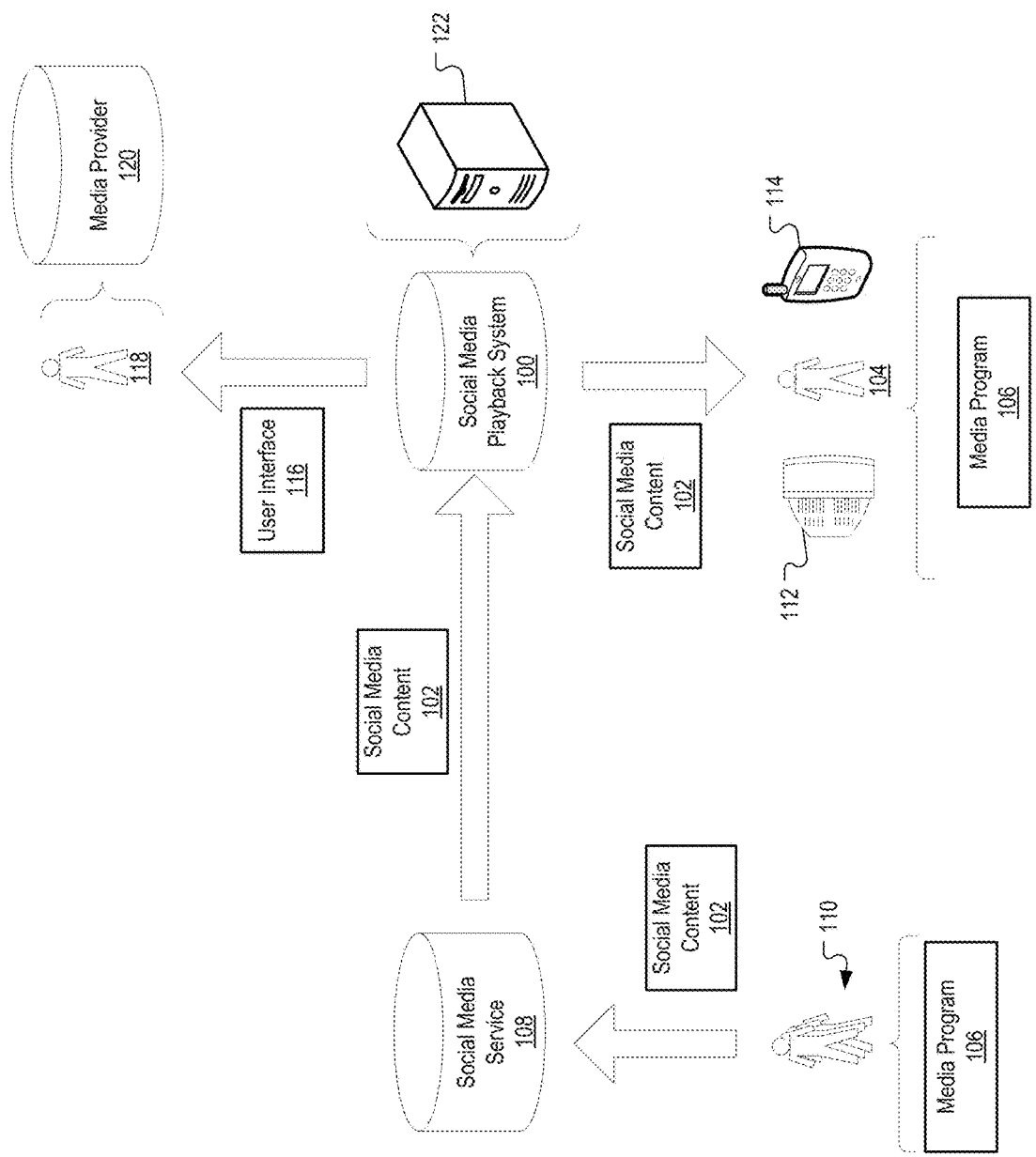
FIGS. 1 through 3 show a social media playback system.

A user who is experiencing a media program (for example, watching a television show or listening to a sports broadcast) can play back social media content pertaining to the media program and that was made available at previous times at which the media program was experienced by other users. In this way, a user can participate in social media relevant to (e.g., pertaining to) a particular media program, even if the media program was experienced by users at a time in the past. For example, if the media program is a television show, a user can watch a recording of the show and simultaneously read what was said on a social media service about the show during previous broadcasts of the show.

Social media content is sometimes formatted into elements of social media content. Each element may have identifying information such as an identity of an author and a time at which the content of the element was first made available (e.g., the time at which the content was authored and/or provided to a social media service for distribution). For example, the time at which the content of the element was first made available may be a timestamp indicating an absolute time, such as the hour, minute, and second on a particular day. A social media playback system that receives the element can use the timestamp to calculate an offset relative to the beginning of a media program for which the element is relevant. In this way, the social media playback system can compile social media content made available during multiple timeframes (e.g., during multiple broadcasts of the media program occurring at different times), and play back the content using the offsets to line up each element of the content with an appropriate point in time during the media program. If the social media content was provided to users of a social media service as a real-time stream of content (e.g., content was provided as soon as it was received by the author), then the playback of content simulates the real-time stream of content. In some examples, a real-time stream of social media content includes elements of social media content that were authored, provided to the social media service, and made available to other users of the social media service all at approximately the same time. When an element of social media content is authored, provided, and made available at approximately the same time, the element can be said to have been "posted."

In some examples, an element of social media content identifies users other than a user who authored the content. For example, an element of social media content may contain a reference to a username of a user other than the user who authored the content, e.g., a username of another user of the social media service. The reference may indicate that the user authoring the content is directing the element of social media to the other user. For example, the element may represent a portion of a conversation among the users. In some examples, social media services maintain one or more databases of connections among its users. For example, users may choose to establish a connection with other users using the social media service. The social media service may provide content to users based on the connections.

As an example, the media program may be a television program, and the social media service may be Twitter, a social media service headquartered in San Francisco, Calif. Elements of social media content provided by Twitter are called "tweets" and the act of authoring and providing content to Twitter for immediate availability (i.e., posting) is called "tweeting." Tweets are typically displayed in a real-time stream called a timeline. In this example, when the television program was first broadcast, one or more users of Twitter may have tweeted about the television program (e.g., commenting on the plot, making observations about the characters, etc.), generating tweets relevant to the television program. Further, other users may have tweeted about the television program at a later time, e.g., when the program was shown in a different time zone, or during a rerun of the program, or using an online television streaming service, or at another time. The social media playback system can identify tweets that were tweeted when users watched the television program, determine which tweets are relevant to the program, and make the tweets available for playback by other users at a later time when those other users watch the television program. The tweets are played back timed relative to the start of the program. For example, if a user tweeted five minutes into the program, then the tweet is displayed five minutes into subsequent broadcasts or viewings of the program. In this way, two tweets that were tweeted days or weeks or months apart may be played back at approximately the same time (e.g., five minutes into the program) if they were tweeted at approximately the same time relative to the start of the program. Tweets typically have a timestamp indicating an absolute time, but the social media playback system can store information identifying tweets with an offset relative to the start of a particular program.

FIG. 1 shows a social media playback system 100. The social media playback system 100 provides social media content 102 to a user 104 who is experiencing a media program 106. The media program 106 could be, for example, a film, episode of a television show, sporting event, news broadcast, or any other kind of media program. In some examples, a media program 106 has a defined start and end, and relates to one or more topics.

The social media content 102 can be received from a social media service 108. In some examples, the social media content 102 could be received by the social media playback system 100 and directly provided by the social media playback system 100 to the user 104. In some examples, the social media playback system 100 could instruct the social media service 108 to provide particular social media content 102 to the user 104, a technique sometimes referred to as indirectly providing the social media content 102 by the social media service 108.

The social media content 102 provided (directly or indirectly) by the social media playback system 100 can be chosen based on its relevance to the media program 106. In some examples, the some of the social media content 102 was originally authored by one or more others users 110 experiencing the media program 106. In some examples, the media program 106 may have been broadcast (e.g., on a television channel, or a radio station, or as a program streaming over the Internet) to many users 110 at a particular time, and during that time, the users 110 may have authored social media content 102 relating to the media program 106 during the timeframe of the broadcast. In some examples, the media program 106 may have been recorded by one of the users 110 or on behalf of one of the users 110 (e.g., if the media program is a television show or similar program, by a digital video recorder service), and some of the social media content 102 may have been authored by the user while that user experiences his or her recording at a time of his or her choice.

In some examples, the user 104 experiences the media program 106 on one device 112 (e.g., a television) and views the social media content 102 on another device 114 (e.g., a computer, smartphone, tablet device, or other electronic device). In some examples, the user 104 experiences the media program 106 and the social media content 102 on the same device (e.g., a computer displaying both a social media client and a television show, or a computer displaying a social media client and playing a streaming radio broadcast, or a "smart TV" that displays content available on a television channel as well as content received from a computer network such as the Internet, etc.).

In some implementations, the social media playback system 100 provides a user interface 116 to a user 118 of a media provider 120. A media provider is any entity which provides media content to users. In some examples, a media provider could be an entity that created the content. In some examples, a media provider could be an entity that distributes the content. A media provider could be a company, a service, a media channel (e.g., television channel or television network or radio station), or any other kind of entity. The user interface 116 enables the user 118 to specify information specific to a media program 106 (e.g., a media program provided by the media provider 120) that can be used by the social media playback service 100 to determine which social media content 102 to display to a user 104 who is experiencing the media program 106. For example, if the media program 106 is a television show, and the user 118 is a representative of the television studio or television network that produces the television show, the representative can use the user interface 116 to instruct the social media playback service 100 to select elements of social media content 102 authored by particular users or containing particular keywords relevant to the television show. This process is sometimes referred to as curation and the user interface 116 is sometimes referred to as a curation tool.

In some examples, the social media playback system 100 includes one or more servers 122, which are computer systems that carry out the operations of the social media playback system 100 and interact with other resources, e.g., the social media services 108.

System Components

Figure 2:
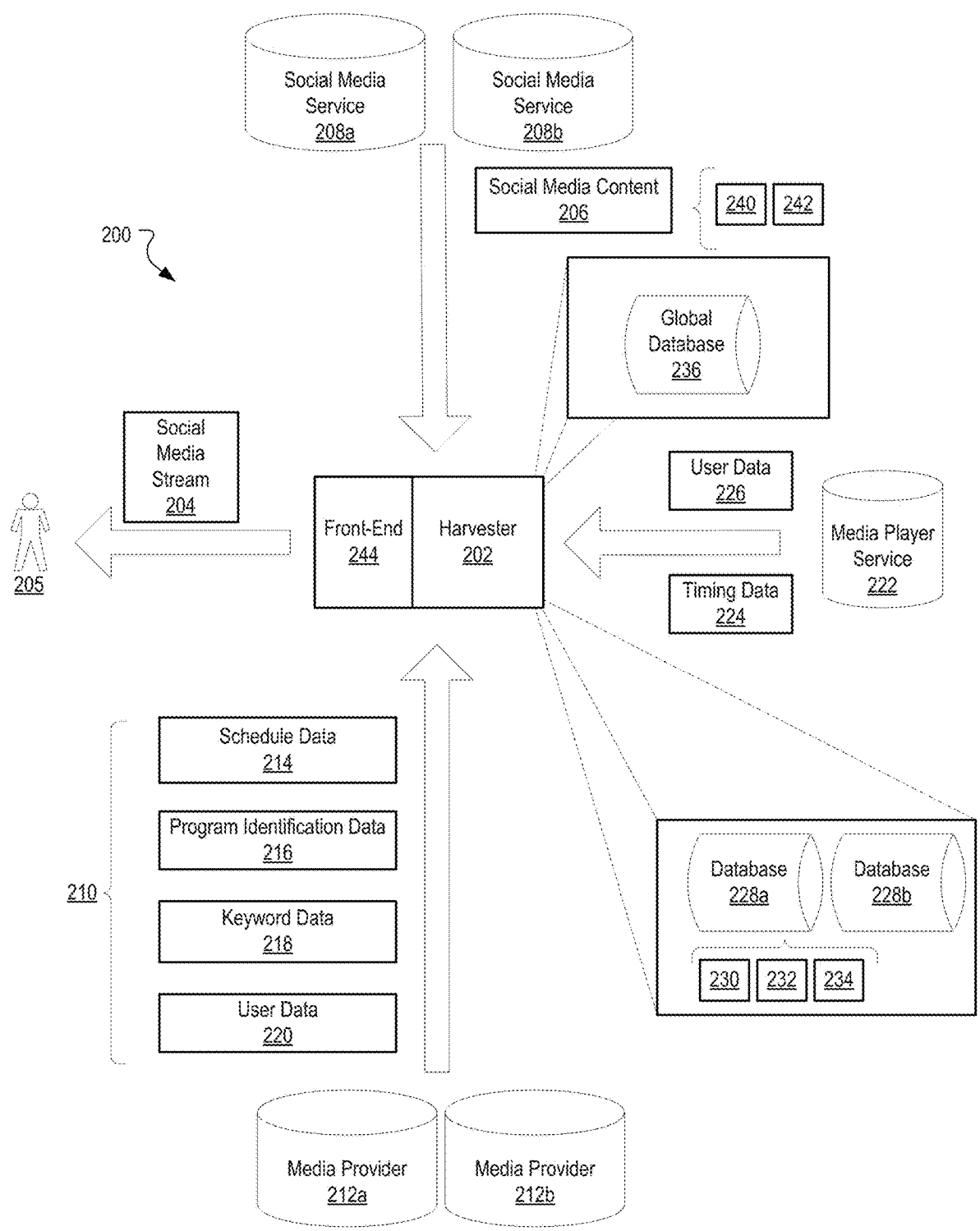

FIG. 2 shows components of a social media playback system 200. For example, the social media playback system 200 could be the social media playback system 100 shown in FIG. 1. The social media playback system includes a harvester module 202. The harvester module 202 receives data from multiple sources to provide a social media content stream 204, sometimes called a "conversation," to each of multiple users 205.

In some implementations, the harvester module 202 receives social media content 206 from social media services 208a, 208b. The social media content 206 may each include data identifying the time at which each element of the social media content 206 was authored or provided to the social media service 208a, 208b and data identifying a user who authored or provided the social media content 206.

In some implementations, the harvester module 202 receives social media content 206 from social media services 208a, 208b by identifying a particular category of social media content 206, e.g., by supplying a search query to a social media service 208a, 208b and receiving elements of social media content 206 responsive to the search query. In some implementations, the harvester module 202 receives all social media content 206 made available by a social media service 208a, 208b and stores some or all of the content for later processing (e.g., for performing a search upon the content).

In some implementations, the harvester module 202 receives program data 210 from media providers 212a, 212b. The program data 210 may include schedule data 214, program identification data 216, keyword data 218, and user data 220.

The schedule data 214 includes information about times at which media programs (e.g., the media program 106 shown in FIG. 1) are broadcast or otherwise experienced by users. For example, if the media provider 212a, 212b is a television network, the schedule data 214 may include information about when particular television programs are broadcast on which television channels. In this way, the harvester module 202 can identify social media content 206 that was posted during a broadcast of a particular media program.

The program identification data 216 identifies particular programs in the schedule data 214. In some examples, the schedule data 214 may identify programs using an identification number, and so the program identification data 216 can be used to determine the name of a program based on an identification number. In some examples, the schedule data 214 may include multiple broadcasts of the same program, and the program identification data 216 can indicate that multiple broadcasts are of the same program.

The keyword data 218 contains information about keywords that are associated with particular media programs. For example, a list of keywords can be provided for some or all of the media programs identified in the program data 210. The keywords can be chosen by the media provider 212a, 212b associated with a particular media program. For example, if the media program is an episode of a television show, the keywords can include the name of the show, the names of the characters, the names of the actors, and so on. The harvester module 202 can use the keyword data 218 to identify which elements of social media content 206 posted during a media program are relevant to the content of the media program. In some examples, the keyword data 218 can be chosen by a media provider 212a, 212b, e.g., chosen by a representative of the media provider using a user interface operable with the harvester module 202 (e.g., the user interface 116 shown in FIG. 1, sometimes called a curation tool).

The user data 220 includes information about users of social media services 208a, 208b (e.g., the users 110 shown in FIG. 1) who post social media content relevant to media programs. For example, a user may be associated with a particular media program. For example, the user may be an actor who stars on a television show and uses a social media service 208a, 208b to talk about the show. As another example, the user may be a fan of the television show and uses a social media service 208a, 208b to give his or her opinions about the show or provide observations about the show. The user can be identified by the user data 220 and the harvester module 202 can use this information to deem that user's social media content as especially relevant to the media program. In some examples, the user data 220 can be chosen by a media provider 212a, 212b, e.g., chosen by a representative of the media provider using a curation tool operable with the harvester module 202.

In some implementations, the harvester module 202 also receives data from a media player service 222. A media player service 222 is an entity that provides media content to users on demand rather than on a fixed schedule. For example, the media player service 222 may operate a streaming video web site, and users of the media player service 222 can view media programs (e.g., television shows and movies) on the streaming video web site at a time of the users' choosing. Social media content posted by the users of the media player service 222 and relevant to a media program offered by the media player service 222 can be identified by the harvester module 202. In some implementations, the media player service 222 provides timing data 224 to the harvester module 202 identifying times at which particular media programs were experienced by users of the media player service 222. In some examples, the timing data 224 may indicate when users of the media player service 222 have paused and restarted a media program so that the harvester module 202 can determine a temporal relationship of social media content posted by users of the media player service 222 to the paused and restarted media program. The media player service 222 can also provide user data 226 identifying users of the media player service 222 as users of one of the social media services 208a. For example, the user data 226 may include a social media service 208a, 208b username also used by the user of the media player service 222. As another example, the user data 226 may include a media player service 222 username, and the harvester may store data correlating that username to a social media service 208a, 208b username. In some examples, identifying information other than usernames can be used. In this way, the harvester module 202 can identify social media content 206 posted by a user of the media player service 222 who is experiencing, for example, a streaming media program.

The harvester module 202 uses information received from social media services 208a, 208b, media providers 212a, 212b, and media player services 222 to update databases 228a, 228b. Each database 228a, 228b contains information relevant to a respective media program (e.g., media program 106 shown in FIG. 1). In some implementations, the databases 228a, 228b contain information relevant to a group of media programs, for example, a television series. In some implementations, the harvester module 202 uses information received from social media services 208a, 208b, media providers 212a, 212b, and media player services 222 to update a global database 236. The global database 236 contains information relevant to all media programs, for example, all words received from the social media services and global word frequencies.

In some implementations, each database 228a, 228b stores social media data 230 referencing elements of social media determined to be relevant to the media program associated with the database 228a, 228b. For example, the social media data 230 may include a uniform resource locator (URL) of each element of social media determined to be relevant to the media program. In some examples, the social media data 230 may be the data of the elements themselves.

In some implementations, each database 228a, 228b stores offset data 232. The offset data 232 indicates, for each element of social media content referenced by the social media data 230, offsets relative to the beginning of the media program associated with the database 228a, 228b. For example, the offsets may be calculated by comparing a timestamp of an element of social media content to a start time of a media program obtained from the schedule data 214 provided by a media provider 212a, 212b.

In some examples, authors of social media content 206 may experience the same media program at different times due to time zones in which the authors are present. For example, the media program may be broadcast at an earlier time of day for viewers in a time zone corresponding to Eastern Standard Time (EST), and the media program may be broadcast at a later time of day for views in a time zone corresponding to Pacific Standard Time (PST), which is three hours behind EST. If the media program is broadcast at a start time of 6 PM EST and again at a start time of 6 PM PST, the two broadcasts will be three hours apart. One author of social media content 206 who resides in New York may post an element 240 of social media content at 6:05 PM EST, while another author of social media content 206 who resides in California may post an element 242 of social media content at 6:04 PM PST, approximately three hours later. The two elements 240, 242 of social media content may pertain to approximately the same moment in time of the media program, e.g., a moment in time about four or five minutes into the program.

The harvester module 202 can compensate for the three hour time difference when determining the offset data 232. For example, the harvester module 202, based on the schedule data 214, can identify that two broadcasts of the media program occurred. In some examples, some of the schedule data 214 specifies broadcasts for one time zone, and some of the schedule data 214 specifies broadcasts for another time zone. When the harvester receives social media content 206, the harvester module 202 can identify (e.g., based on the schedule data 214 and based on timestamps of the elements 240, 242) that the first element 240 of social media content was posted five minutes after the start time of the media program, and that the second element 242 of social media content was posted four minutes after the start time of the media program.

When data associated with the elements 240, 242 of social media content are stored in the database 228a, 228b associated with the media program, the harvester module 202 can store offset data 232 reflecting the offsets from the two different start times of the broadcasts in different time zones. For example, offset data 232 for the first element 240 can be stored that indicates an offset of five minutes, and offset data 232 for the second element 240 can be stored that indicates an offset of four minutes. The harvester module 202 need not store information about the original time zones of the elements 240, 242, for example.

In some implementations, each database 228a, 228b stores curation data 234. The curation data 234 may include data indicating which elements of social media (referenced by the social media data 230) will be displayed in a social media stream 204 provided to a user 205 of the social media playback system 200, and in what order. The curation data 234 is generated by the harvester module 202 and described in further detail with respect to FIG. 3.

A social media stream 204 is a collection of elements of social media content synchronized to a media program. Once the harvester module 202 has generated a database 228a, 228b for a particular media program, the harvester can identify which elements of social media referenced in the database will be shown to a user 205 who is experiencing the media program. The identified elements can then be assembled into a social media stream 204 and displayed to the user 205 in a manner that is synchronized with the media program, e.g., based on the offset data 232.

Further, elements of social media can be arranged in the social media stream 204 based on the offset data 232. Referring to the example above describing the elements 240, 242 of social media content authored in different time zones, the second element 242 of social media (having an offset of four minutes) will appear in the social media stream 204 (e.g., be displayed to a user 205 who receives the social media stream 204) just before the first element 240 of social media (having an offset of five minutes) appears in the social media stream 204, even though the first element 240 was posted about three hours before the second element 242.

For example, if the social media service is Twitter and the media program is an episode of a television show, the social media stream 204 can be a collection of tweets synchronized with the television show. In this example, the user 205 may be watching a re-run or later broadcast of a television show that has already aired. If a tweet was posted to Twitter five minutes into an original broadcast of the television show, then the tweet will be displayed to the user 205 five minutes into the re-run or later broadcast of the television show. The social media stream 204 could also include a tweet that was posted five minutes into a different, earlier re-run or earlier broadcast of the television show. The two tweets would be displayed at approximately the same time in the social media stream 204, because they have approximately the same offsets from the start of the television show, even though the tweets themselves were made hours, days, or months apart. The social media stream 204 could also contain content from other social media services, e.g., Facebook, GetGlue, or any other social media service.

In some implementations, the harvester module 202 includes a threshold number of elements of social media content in the social media stream 204 for a quantity of time. For example, the harvester module 202 may include no more than one element of social media content for every three seconds of time that elapses during playback of the social media stream 204 during the associated media program.

Figure 3:
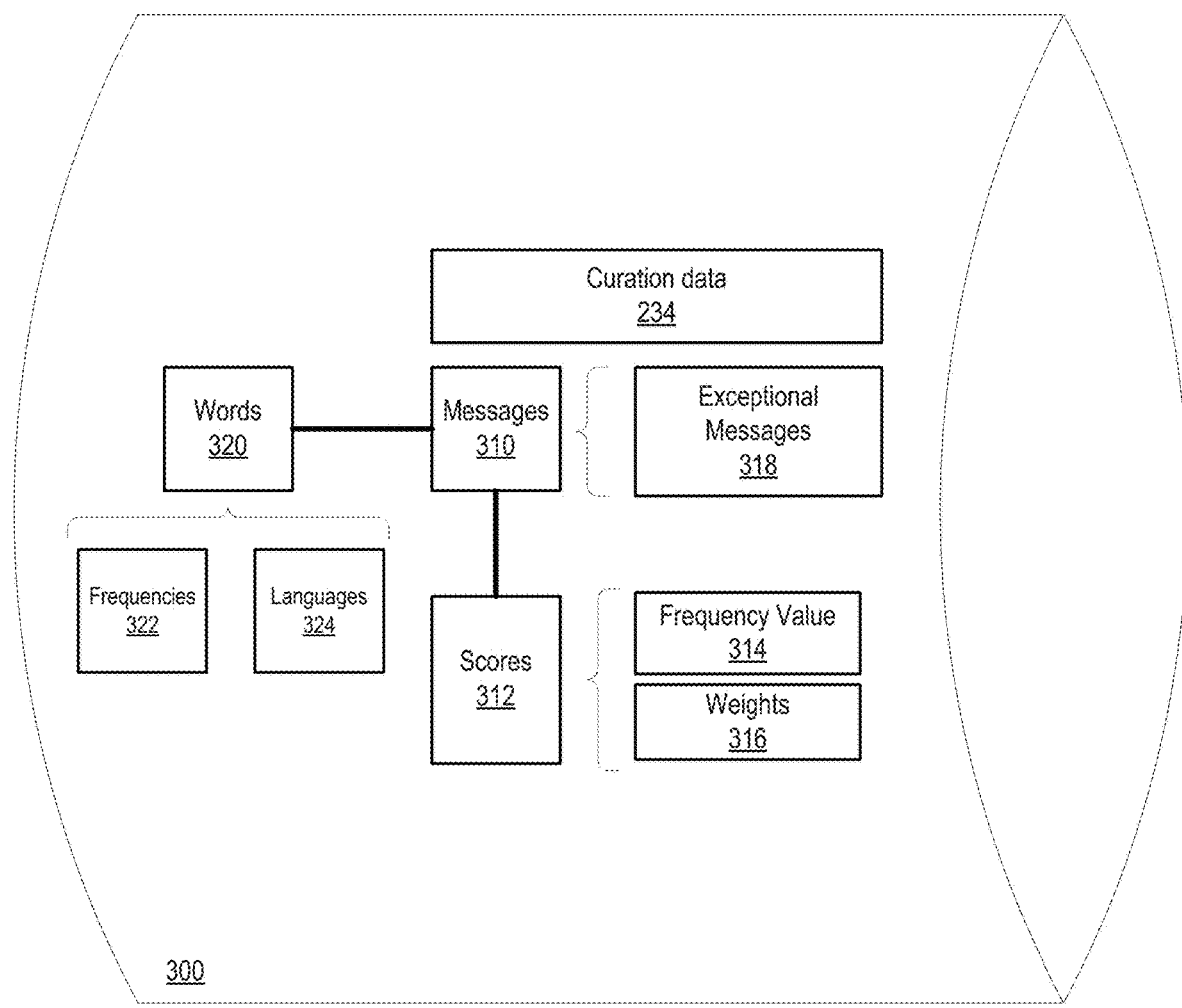

FIG. 3 shows a database 300. For example, the database 300 could be one of the databases 228*a*, 228*b* shown in FIG. 2, storing curation data 234.

Information in the database 300 can be used to indicate that a particular element of social media content (here called social media messages or simply messages) should be ranked higher than another message. For example, the messages can be ranked. The ranking can then be used to retrieve only messages that are, based on the ranking, most likely to relate to a topic of a media program associated with the database 300. The ranking can be used to pare down a number of messages to be delivered to users experiencing the media program, e.g., by only providing a threshold number of messages.

In some implementations, the database 300 may store one or more messages 310 each associated with a score 312. The score 312 indicates a priority of the associated message 310, such that a first message having a score higher than a second message will be more likely to be chosen for a social media stream 204 (FIG. 2) than the second message. The score 312 can be calculated based on a frequency value 314 and a weight 316. The weight 316 is sometimes called an "adjustment."

In some implementations, the score 312 can be based on a technique called term frequency-inverse document frequency. In some examples, each message is separated into terms (e.g., words, groups of words, portions of words, or other portions of the message), and then for each of those terms (here, words will be used as an example), the term frequency of the word across all messages 310 associated with a media program can be evaluated. Each of the words can be assigned a value indicating the importance of the word. In some examples, a word that appears frequently in all messages 310 associated with a media program may be assigned a value indicating a lower importance than words that appear less frequently. For example, words such as "the" or "and" may appear frequently in the messages 310 and be assigned a low importance value. In some implementations, the importance value of each word is calculated by multiplying the frequency of the word by an inverse document frequency. An inverse document frequency can be calculated by the formula: $\log_2(M/T)$ where $\log_2$ is the logarithm base 2 function, M is the total number of messages 310, and T is the number of messages 310 that contain the word. The importance values of the words can be summed together to generate a frequency value 314, sometimes called a "total messages score."

Each message 310 can also be associated with one or more weights 316. A weight 316 is a value that modifies the frequency value 314 to generate the score 312, sometimes called an "adjusted score." For example, the frequency value 314 can be multiplied by one or more weights 316 to generate the score 312. In another example, the frequency value 314 is multiplied by one or more weights 316, and the results are summed to generate the score 312. In some implementations, the number of characters or words in a message 310 determines whether any weights 316 will be associated with the message 310. For example, if a message contains less than ten characters, a low score 312 will be associated with the message 310, and no determination of weights 316 will occur. In some implementations, the score 312 is normalized to fall within a range, for example, a percentage range from 0 to 100 percent. For example, the score 312 is divided by the highest score 312 for all messages 310.

In some implementations, keyword data 218 (FIG. 2) can be used to calculate a weight 316. For example, if a message 310 contains one or more keywords identified in the keyword data 218, then the message 310 can be assigned a weight 316 that would increase the score 312 relative to messages that contain none of the keywords. As another example, if a message 310 contains one or more banned words identified in the keyword data 218, then the message 310 can be assigned a weight 316 that would decrease the score 312, e.g., a weight of zero.

In some implementations, user data 220 (FIG. 2) can be used to calculate a weight 316. For example, if a message 310 was authored by a user identified in the user data 220, then the message 310 can be assigned a weight 316 that would increase the score 312 relative to messages that were not authored by a user identified in the user data 220 (e.g., a user identified as belonging to a special category such as "celebrity" or "superfan").

In some implementations, author post counts can be used to calculate a weight 316. For example, a message 310 that was authored by a user identified in the user data 220 (FIG. 2) can be compared for similarity to previous messages 310 authored by the same user identified in the user data 220. If the message 310 is similar or identical to the previous messages 310, then the message 310 can be assigned a weight 316 that would decrease the score 312 relative to messages that were dissimilar to the previous messages 310 authored by the same user identified in the user data 220. If the message 310 is less similar to the previous messages 310, then the message 310 can be assigned a weight 316 that would increase the score 312 relative to messages that were similar to the previous messages 310 authored by the same user identified in the user data 220.

In some examples, if scores 312 of a user's previous messages 310 were above a predetermined threshold, then the message 310 can be assigned a weight 316 that would increase the score 312 relative to messages with scores at or below the predetermined threshold. In this way, users who have written messages that have a high score (e.g., above the predetermined threshold) may have future messages assigned a slightly higher score than they would if they were written by a different user.

As an example, a particular user may have posted five messages during the course of an event (e.g., social media program). If the first four messages scored highly (e.g., above a threshold), and message five scored low (e.g., below the threshold), since the user has posted several messages and the first few were highly ranked/scored, then the fifth message could receive a weight that increases its score. In this way, users who appear to post "good" content can be identified and their content can be recognized.

As another example, if the first four messages posted by a user scored low (e.g., below a threshold), and message five scored higher (e.g., above the threshold), since the user has posted several messages and the first few were poorly ranked/scored, then the fifth message could receive a weight that decreases its score. In this way, users who appear to post "bad" content (e.g., "spam") can be identified and their content can be made less likely to appear in a social media stream.

In some implementations, topic similarity can be used to calculate a weight 316. For example, if a message 310 is determined to be more on topic, then the message 310 can be assigned a weight 316 that would increase the score 312 relative to messages that were less on topic. In some implementations, a message is determined to be on topic if the message is determined to be relevant to a particular topic, e.g., a media program. Example algorithms for determining topicality are Latent Dirichlet Allocation and Latent Semantic Analysis.

In some implementations, search term frequency (e.g., keyword frequency) can be used to calculate a weight 316. For example, a message can be associated with search terms and only those messages 310 associated with at least an initial threshold number of search terms are stored in the database 300. If the message 310 is associated with at least a threshold number of search terms, then the message 310 can be assigned a weight 316 that would increase the score 312 relative to messages 310 that did not contain at least the threshold number of search terms. As another example, based on the social media service 208a, 208b (FIG. 2) associated with the message 310, it 310 will be stored in the database 300 regardless of the initial threshold number of search terms associated with the message 310. For example, if the social media service 208a, 208b (FIG. 2) is Facebook, the message 310 will be stored in the database 300, whereas if the social media service 208a, 208b (FIG. 2) is Twitter, only messages with at least one search term will be stored in the database 300. If a stored message 310 is associated with at least a threshold number of search terms, then the message 310 can be assigned a weight 316 that would increase the score 312 relative to messages that are not associated with at least a threshold number of search terms.

In some implementations, a number of message reposts can be used to calculate a weight 316. For example, a message 310 can be associated with an element of social media content 240 (FIG. 2) that has been reposted (e.g., retweeted in the case of Twitter). The element of social media content 240 can indicate the number of times that element has been reposted. If the message 310 is determined to be on topic, then the message 310 can be assigned a weight 316 that would increase the score relative to messages that are not associated with reposted elements of social media content. For example, the weight 316 can be multiplicative or directly related to the number of reposts. In some implementations, the harvester 202 (FIG. 2) can take further action to affect the social media stream 204 (FIG. 2) based on the message 310 associated with a reposted social media element 240. For example, the harvester may filter out all other reposted messages 310 from the social media stream 204 that have similar content or filter out only some of the other reposted messages 310 based on the message's 310 popularity (see below) and the number of messages in the social media stream 204.

Messages 310 that have similar content are messages that have most or all of their content in common with each other. For example, messages that share most (or all) of the same words, or contain identical words and differ only in punctuation, are messages having similar content. In some implementations, an algorithm such as a Levenshtein distance algorithm can be used to identify messages having similar content.

In some implementations, a number of affirmations—sometimes called "votes"— can be used to calculate a weight 316 (e.g., a weight indicative of the popularity of a message). For example, a message 310 can be associated with an element of social media content 240 (FIG. 2) that has received a number of affirmations (e.g., "likes" on Facebook, "+1" on Google). The element of social media content 240 can indicate the number of times that element has received an affirmation. Then, the message 310 can be assigned a weight 316 that would increase the score 312 relative to messages that were associated with social media content elements 240 that received fewer affirmations.

In some implementations, the popularity of a particular user 205 (FIG. 2) of a social media service 208a, 208b (FIG. 2) can be used to calculate a weight 316. The popularity can be part of the user data 220 (FIG. 2). For example, a message 310 can be assigned a weight 316 that would increase the score 312 relative to messages 310 that have a lower popularity. In some implementations, the weight is dependent on the popularity value itself, and in other implementations, the popularity value would need to be above a certain threshold value before a weight 316 would be assigned. For example, if the social media service 208a, 208b is Twitter, the popularity can be the number of "followers" of the user 205. If the social media service 208a, 208b is Facebook or Google+, the popularity can be the number of "friends" or "circles," respectively, of the user 205.

In some implementations, the presence of a URL can be used to calculate a weight 316. For example, if a message 310 contains one or more URLs, then the message 310 can be assigned a weight 316 that would increase the score 312 relative to messages that do not contain a URL.

Any of the factors described here can be used alone or in combination when calculating a weight 316. For example, weight 316 can be determined by a single factor or multiple factors.

In some implementations, the database 300 contains curation data 234. The curation data 234 specifies which messages 310 will be included in a social media stream 204 (FIG. 1). In some examples, the curation data 234 specifies a number of messages based on a threshold number of messages for a quantity of time. For example, the threshold may be one message for every three seconds of time elapsed in the social media stream 204 during playback of the stream.

The messages 310 specified by the curation data 234 can be chosen based on the scores 312. In some examples, all of the messages 310 associated with a span of time are identified, e.g., based on offsets (e.g., offset data 232 shown in FIG. 2) associated with the messages. For example, all messages having an offset of three seconds to six seconds after the start time of a media program can be identified. Of those messages, the message 310 having the highest score 312 can be chosen. In some examples, if two or more messages 310 have the same highest score 312, one of the messages 310 with the same highest score 312 will be chosen at random. In this way, the curation data 234 can include messages 310 automatically chosen based on the scores.

In some examples, the database 300 can include data indicating exceptional messages 318 among the messages 310. For example, messages identified as having been authored by a user having special status (e.g., a celebrity associated with a media program) may always be specified by the curation data 234 for inclusion in a social media stream, even if those messages would exceed a threshold number of messages for a quantity of time. In some examples, an exceptional message 318 may also appear in a social media stream for a longer period of time than other messages 310.

In some examples, the curation data 234 data specifies messages that were manually rejected or manually accepted by a user operating a user interface (e.g., the user interface 116 shown in FIG. 1). For example, a message that was manually rejected may never appear in a social media stream 204.

The curation data 234 can be updated over time. In some implementations, the harvester module 202 (FIG. 2) updates the curation data 234 each time new social media content pertaining to a media program is received. For example, the harvester module 202 may update the curation data 234 (including, for example, adding messages 310 and updating the scores 312) after each broadcast of a media program. In another example, the harvester module 202 may update the curation data 234 as new social media content 206 is received during each broadcast of a media program.

In some implementations, the harvester module 202 (FIG. 2) will include a message 310 in the social media stream 204 (FIG. 2) for a particular user 205 (FIG. 2) regardless of the curation data 234. For example, if the user 205, who authored the message 310 as indicated by the user data 220 (FIG. 2), was logged into the social media provider 208a, 208b (FIG. 2) providing the social media content 206 (FIG. 2), then that message 310 would always be included in the social media stream 204 delivered to that user 205. Each user may receive a different social media stream 204 than the other users. For example, one user 205 may receive one social media stream 204, while another user may receive a different social media stream containing at least some content that is absent from the first social media stream 204.

In some implementations, the database 300 stores words 320 and their associated frequencies 322. For example, when a new message 310 is stored in the database 300, each word 320 in the message 310 can be checked to see of it exists in the database 300. If the word 320 exists in the database 300, a frequency 322 associated with the word 320 is incremented. If the word 320 does not exist in the database 300, the word 320 is added to the database 300 and the frequency 322 is set to an initial value, e.g., one. In some implementations, a global database 236 (FIG. 2) stores global words 320 and global frequencies 322. When a new message 310 is stored in the database 300, each word 320 in the message 310 can be checked to see if it exists in the global database 236. If the word 320 exists in the global database 236, a frequency 322 associated with the word 320 is incremented. If the word 320 does not exist in the global database 236, the word 320 is added to the global database 236 and the global frequency 322 is set to an initial value, e.g., one.

In some implementations, the database 300 stores a language 324 associated with each word, and each message 310 is associated with one or more languages 324. Each message 310 can be associated with a score 312 associated with a language 324. In some implementations, if the language 324 associated with the message 310 is not one or more particular languages, the message 310 is assigned a low score 312 (e.g., zero).

In some implementations, a front end 244 (FIG. 2) allows a user 205 (FIG. 2) to further refine what messages 310 appear in the social media stream 204 (FIG. 2). For example, the user 205 may indicate through the front-end 244 that the user 205 wants messages 310 associated with particular languages 324 to be included in the social media stream 204. Then, for each language 324 indicated through the front-end 244 by the user 205, the associated message 310 for that language 324 with the highest score 312 is included in the social media stream 204. In some examples, if two or more messages 310 have the same highest score 312, one of the messages 310 with the same highest score 312 will be chosen at random. In another example, if the number of messages 310 included in the social media stream 204 for some period of time that are associated with a particular language 324 is above a threshold, then one of the messages 310 will be chosen at random.

In another example, the user 205 may indicate through the front-end 244 that the user 205 wants a different quantity of time to be used in selecting the message 310 with the highest score 312 (e.g., one message every five seconds instead of one message every three seconds).

Computer Systems

Figure 4:
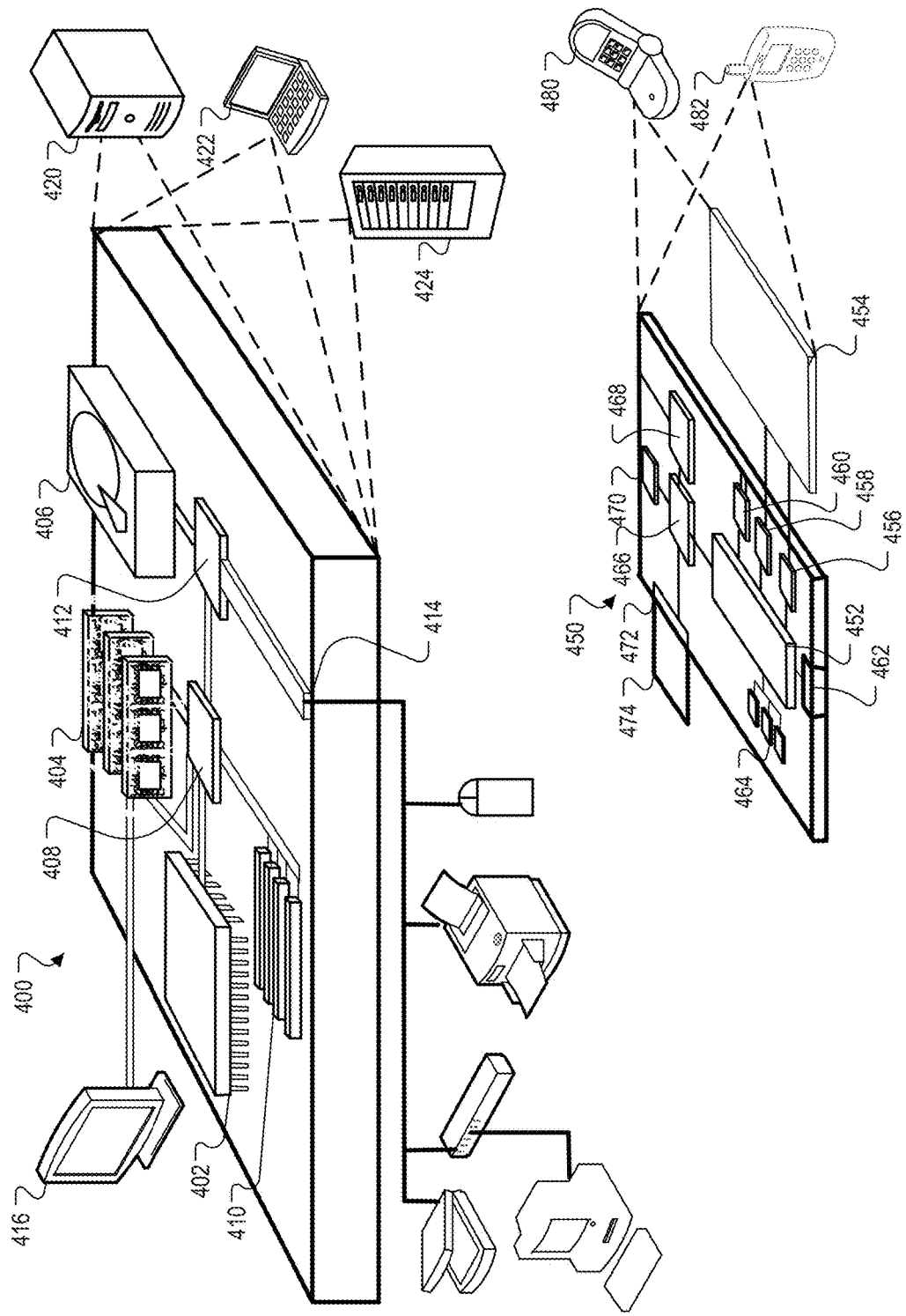
FIG. 4 shows computing devices.

FIG. 4 is a block diagram of example computing devices 400, 450. For example one computing device 400 could be a portion of the social media playback system 108 shown in FIG. 1. For example, the computing device 400 could be a server 122 (FIG. 1) that executes the harvester module 202 shown in FIG. 2 (e.g., carry out instructions representing the operations of the harvester module 202). In some examples, multiple servers, e.g., multiple computing devices 400, are used to execute the harvester module 202. In some examples, the computing device 450 could be one of the devices 112, 114 shown in FIG. 1. For example, the computing device 450 could be a mobile computing device (e.g., laptop, smartphone, tablet computer). In some examples, one of the devices 112, 114 shown in FIG. 1 could be an example of the computing device 400.

One computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 (e.g., a computer monitor or television) coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as mobile computing device 450. Each of such devices may contain one or more of computing device 400, 450, and an entire system may be made up of multiple computing devices 400, 450 communicating with each other.

The mobile computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

The processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In-Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

The mobile computing device 450 may communicate wirelessly through communication interface 466, e.g., an Ethernet card, a serial communication device, e.g., an RS-232 port, and/or a wireless interface device, e.g., an 802.11 card, a 3G wireless modem, a 4G wireless modem, or another interface, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (e.g., the transceiver 104 shown in FIG. 1). In addition, GPS (Global Positioning System) receiver module 470 may provide additional navigation- and location-related wireless data to device 450, which may be used as appropriate by applications running on device 450.

The mobile computing device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, and so forth) and may also include sound generated by applications operating on device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

A server can be realized by instructions that upon execution cause one or more processing devices to carry out processes relevant to the functions described above. Such instructions can comprise, for example, interpreted instructions such as script instructions, or executable code, or other instructions stored in a computer readable medium. A server can be distributedly implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although example devices have been described in FIG. 4, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible program carrier, for example a computer-readable medium, for execution by, or to control the operation of, a processing system. The computer readable medium can be a non-transitory physical device such as a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of a social media playback system 100) is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Methods of Operation

FIG. 5A shows a flowchart of a process 500 representing operations of a social media playback system (e.g., the social media playback system 100 shown in FIG. 1). Social media content is received 502 from at least one social media service. The social media content includes elements of social media. For example, the social media content could be the social media content 102 shown in FIG. 1, and the social media service could be the social media service 108 shown in FIG. 1.

Schedule data pertaining to at least one media program is received 504 from at least one media provider. For example, the media program could be the media program 106 shown in FIG. 1 and the media provider could be the media provider 120 shown in FIG. 1.

Social media content relevant to the media program is identified 506 at least in part based on the schedule data. For example, the schedule data could be the schedule data 214 shown in FIG. 2. In some implementations, keyword data 218 is used to identify the social media content. For example, social media content containing one or more keywords of the keyword data 218 may be identified.

Data associating the identified social media content and the media program is stored 508. The data indicates times associated with respective elements of social media content. For example, the data could be stored in one of the databases 228a-b shown in FIG. 2.

The times are expressed as an offset relative to a time associated with the media program. In some implementations, the time associated with the media program is a start time of the media program. For example, the times associated with respective elements of social media can be each expressed as an offset from the start time of the media program. In this way, the social media playback system need not make calculations for time zones or different broadcasts of the media program when synchronizing the social media content with the media program.

In some implementations, the process 500 includes providing, to a user of the social media playback system, at least some of the identified social media content. For example, the social media content can be presented in a user interface as a stream of content synchronized to the media program. In some implementations, the stream of content is synchronized to the media program based on the offset associated with respective elements of social media content of the stream. The stream of content could be the social media stream 204 shown in FIG. 2.

In some implementations, the process 500 includes receiving, from an entity associated with the media provider (e.g., from a user associated with or authorized by the media provider), data specifying characteristics of social media content. Further, social media content relevant to the media program can be identified, at least in part based on the data specifying characteristics of social media content. The characteristics could include one or more authors of social media content or one or more keywords.

In some implementations, social media content is received (502) in response to receiving (504) schedule data. For example, the social media playback system can provide, to the social media service, a query that is based on the received schedule data, and the social media service can provide the social media content.

Figure 5B:
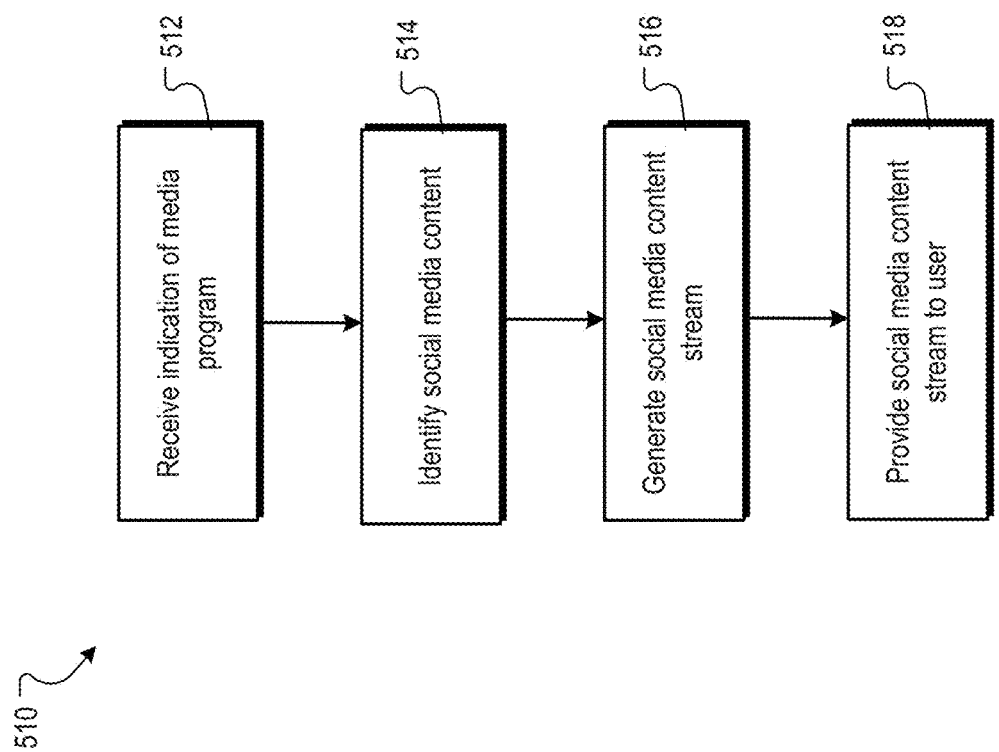

FIG. 5B shows a flowchart of another process 510 representing operations of a social media playback system (e.g., the social media playback system 100 shown in FIG. 1).

An indication is received 512 that a user has begun experiencing a media program. For example, the user could be a user known to the social media playback system 100, e.g., a user having a user account associated with the social media playback system 100.

Social media content pertaining to the media content is identified 514. For example, the social media content may be stored in a database that is associated with the media program, e.g., the database may be assigned to the media program.

A stream of social media content is generated 516. For example, the stream of social media content is based on the social media content in the database. In some examples, the stream of social media content can be generated based on curation data associated with the database. Some of the social media content stored in the database may not be included in the stream, based on the curation data.

The stream of social media content is provided 518 to the user. In some implementations, the stream of social media content can be synchronized to the media program, e.g., based on offsets associated with each element of the social media content. For example, social media content having an offset of five minutes can be provided to the user five minutes into the media program.

Figure 5C:
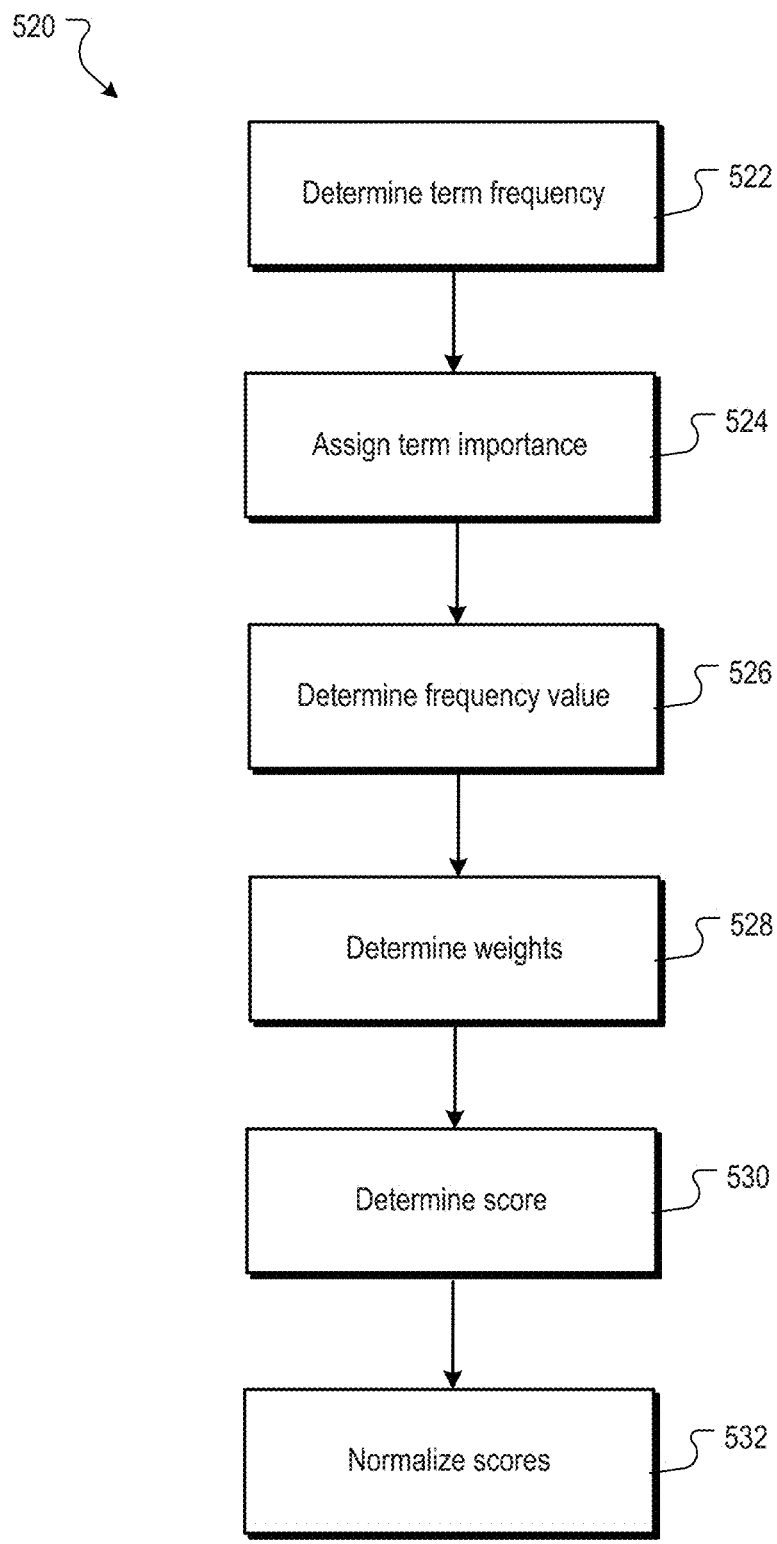

FIG. 5C shows a flowchart of another process 520 representing operations of a social media playback system (e.g., the social media playback system 100 shown in FIG. 1). For example, the operations can be carried out by computer system components (e.g., processors) of the social media playback system.

The curation data that can be used to generate the stream of social media content 516 (FIG. 5B) can be based on scores. For example, particular elements of social media content (messages) can be ranked based on scores. In some implementations, the frequency of terms in a message is determined 522. For example, each message is separated into words, and then for each of those words the term frequency of the word across all messages associated with a media program can be determined 522.

In some implementations, each of the words can be assigned a value indicating the importance of the word 524. In some examples, a word that appears frequently in all messages associated with a media program may be assigned a value indicating a lower importance than words that appear less frequently. For example, words such as "the" or "and" may appear frequently in the messages and be assigned a low importance value.

In some implementations, a frequency value is determined for the message 526. For example, for each word in a message, an inverse document frequency can be calculated by the formula: $\log_2(M/T)$ where $\log_2$ is the logarithm base 2 function, M is the total number of messages associated with a media program, and T is the number of messages that contain the word. The inverse document frequency of the word is multiplied by the determined term frequency of the word 522 to assign an importance to the word 524. The importance values for each word in the message can be summed together to determine a frequency value for each message 526, sometimes called a "total messages score."

In some implementations, one or more weights are determined for each message 528. For example, if a message contains one or more keywords, then a weight can be determined for the message 528 that would increase the score relative to messages that contain none of the keywords. As another example, if a message contains one or more banned words, then a weight can be determined for the message 528 that would decrease the score, e.g., a weight of zero. Other examples of determining weights are described above with respect to FIG. 3, e.g., describing messages 310 being associated with one or more weights 316.

In some implementations, a score is determined for each message 530. For example, the frequency value determined for the message 526 can be multiplied by one or more weights determined for the message 528 to determine the score for the message 530. In another example, the determined frequency value 526 is multiplied by one or more determined weights 528, and the results are summed with the determined frequency value to generate the score 530.

In some implementations, the scores for all messages associated with a social media program are normalized 532. For example, to normalize the scores 532 by converting the scores to a range from 0 to 100 percent, each determined score 530 is divided by the highest determined score 530 for all messages associated with the social media program.

User Interfaces

Figure 6:
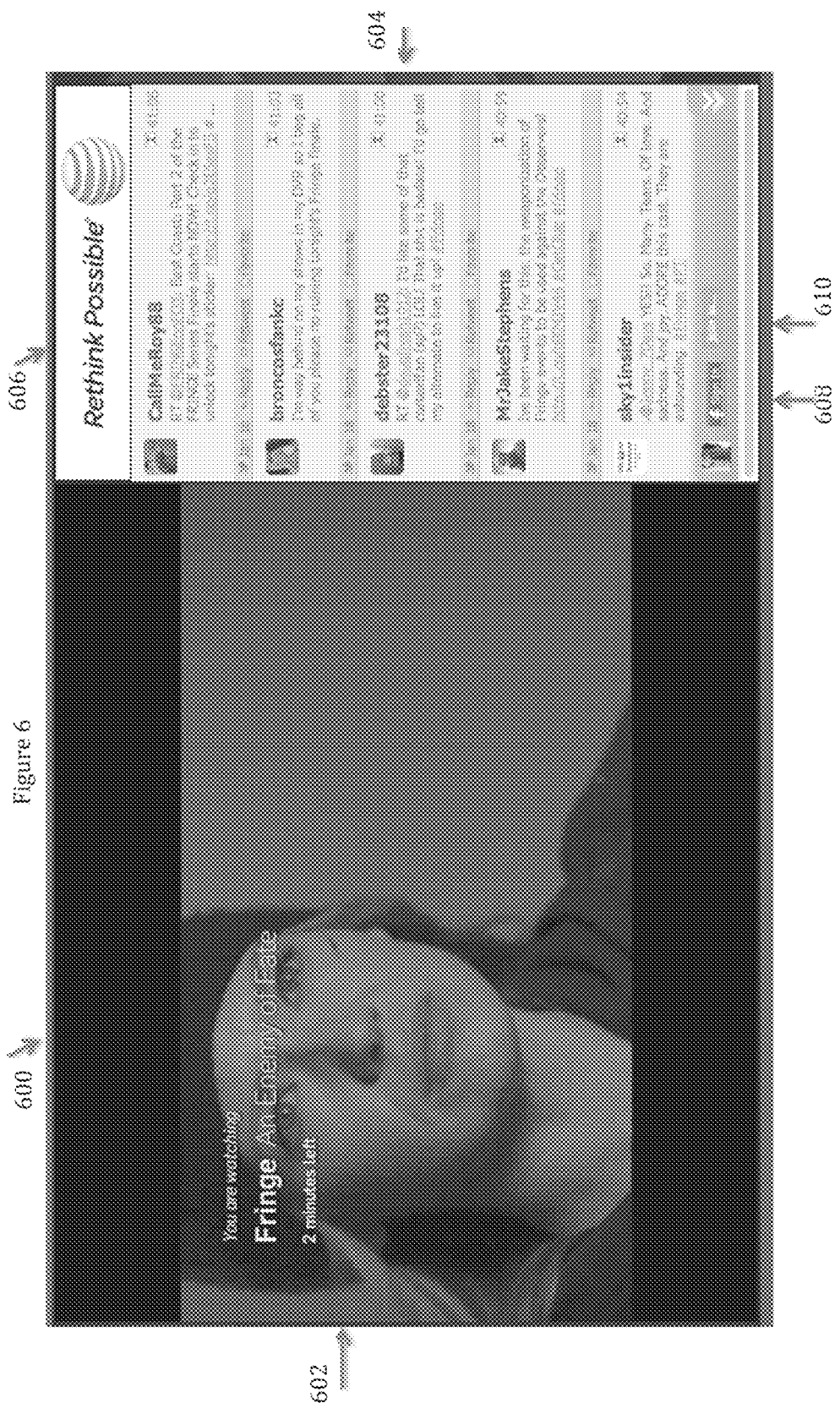
FIGS. 6 through 23 show user interfaces.

FIG. 6 shows an example user interface 600 of the social media playback system 100 (FIG. 1). For example, the user interface 600 could be displayed on one of the devices 112, 114 shown in FIG. 1. The user interface 600 includes a media viewing pane 602, a social media pane 604, and an advertisement area 606. A user of this interface 600 can experience a media program in the media viewing pane 602 while simultaneously playing back social media content pertaining to the media program in the social media pane 604. For example, the social media content displayed in the social media pane 604 may be a portion of a social media content stream 204 (FIG. 2). In this way, a user can undergo an experience of participating in "live" social media discussion even though the social media content may have been entered at previous times at which the media program was experienced by other users. In addition to viewing other people's content (here, sometimes referred to as messages), a user of the user interface 600 may sign in to a particular social network by clicking the "Sign in" button 608 at the bottom of the social media pane 604. The user may add her own messages to the current social media stream by clicking the "Join in" button 610. While the user is engaged in these activities, the advertisement area 606 can display advertisements relevant to the media program being viewed or relevant to the social media content displayed in the social media pane 604 or both. For example, the advertisements can be chosen by the social media playback system 100.

As time passes, the messages displayed in the social media pane 604 can scroll (e.g., scroll upward), so that new messages can enter into view and old messages exit from view.

Figure 7:
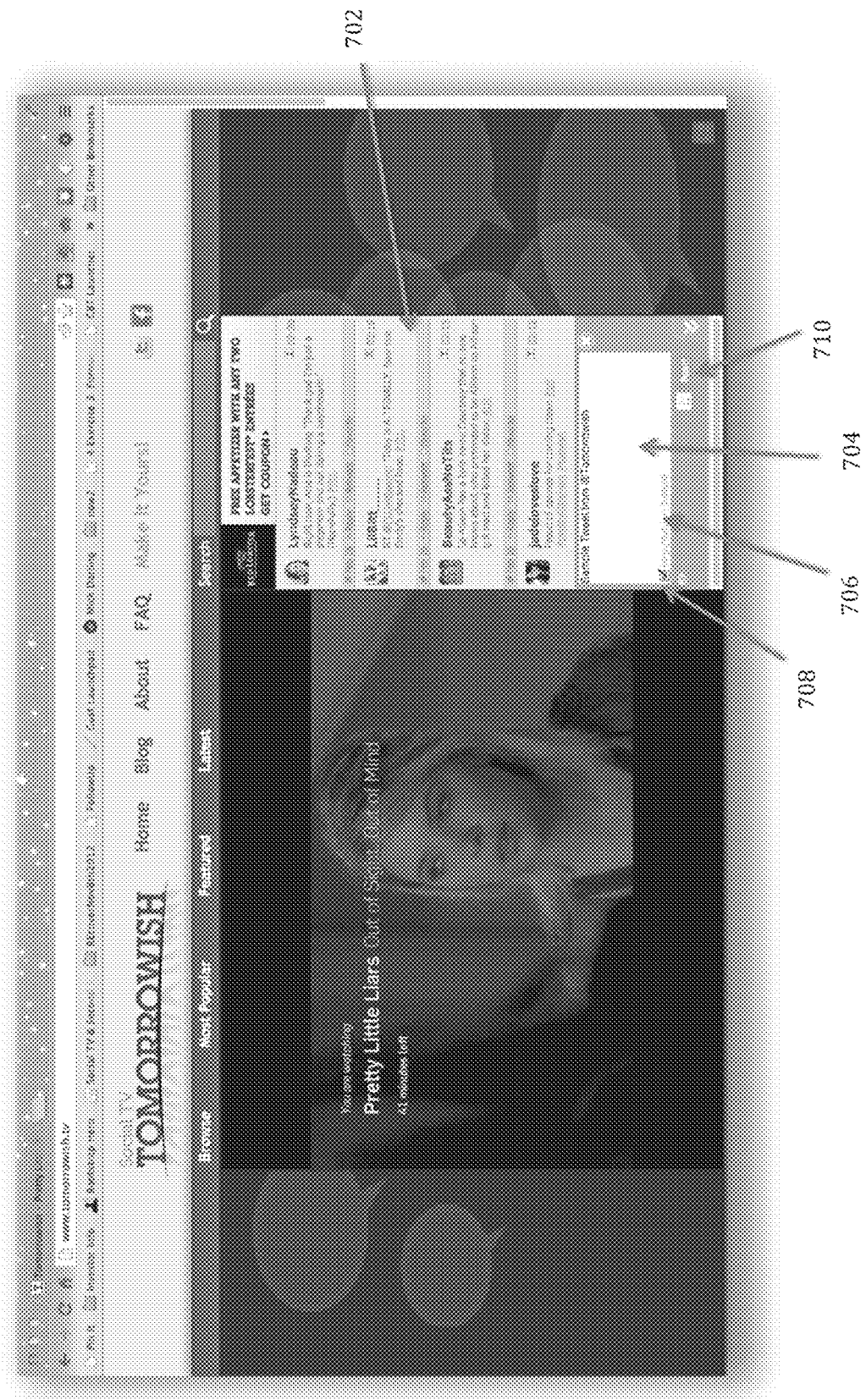

FIG. 7 shows another view of the user interface 600. In this view, a user has clicked the "Join in" button 610 at the bottom of the social media pane 604 (FIG. 6). As a result, a new text area 704 has opened up in the social media pane 702 for the user to add a new message. A shortened URL 706 is automatically inserted into the text area 704 that points to a specific moment in the media program the user is watching when the user decides to add the message. For example, another user (e.g., another user of the social media service) could use the shortened URL 706 to view the moment in the media program. A checkbox 708 is also provided next to the URL. The selection of the checkbox instructs the social media playback system 100 to append the URL to the user's message. Clicking the post button 710 below the text area 704 adds the newly created message to the social media stream.

Figure 8:
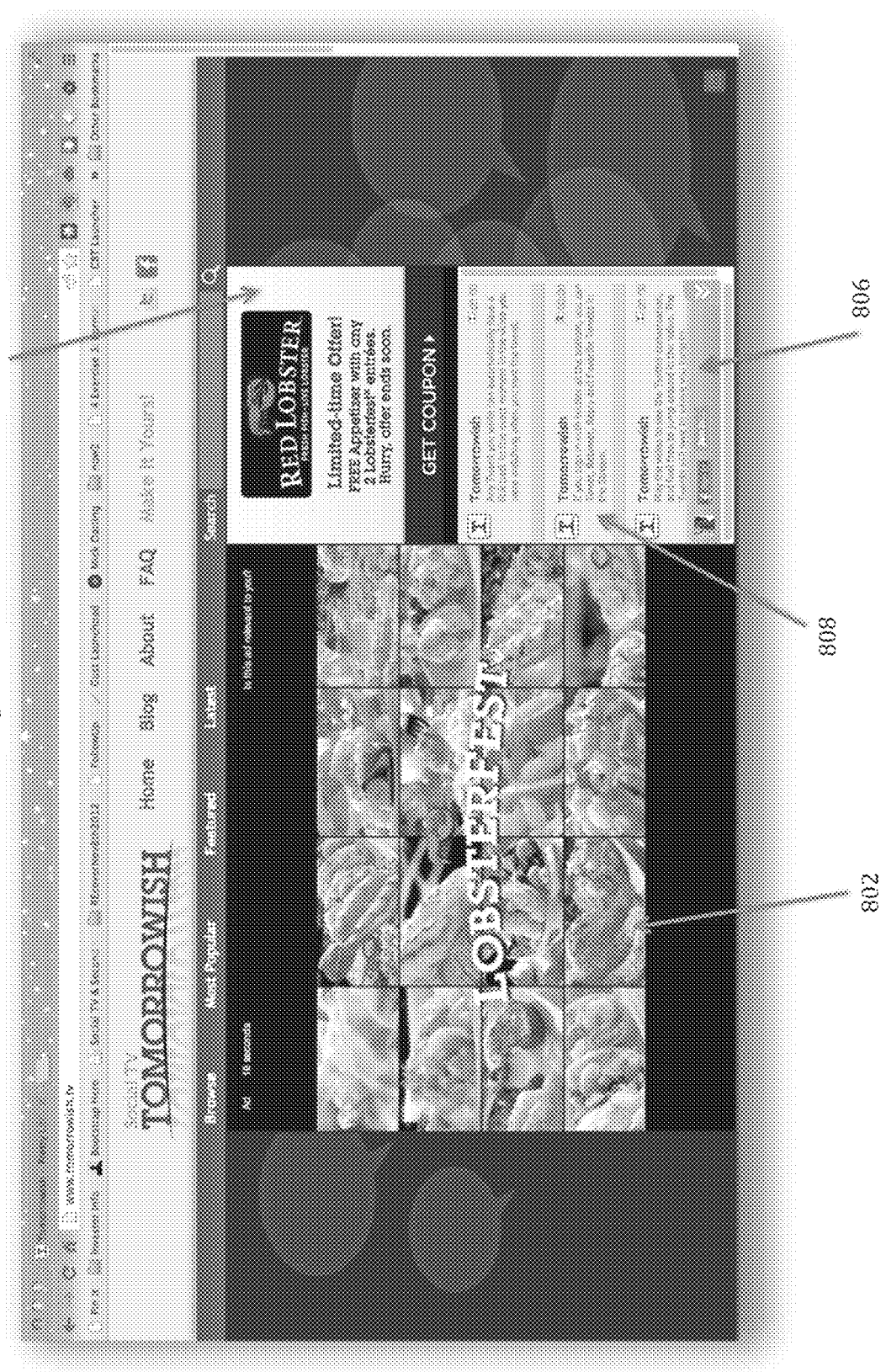

FIG. 8 shows another view of the user interface 600. In this view, the media program being viewed has entered a commercial break (e.g., a period in which advertisements are displayed). In some examples, social media content relevant to a media program is not available at times at which advertisements were displayed between segments of the media program, and so social media content need not be displayed. In some implementations, the commercial is shown in the media viewing pane 802, the advertisement area 804 expands into the space previously occupied by the social media pane 806 and displays matching advertisements to that shown in the media viewing pane 802. The social media content pertaining to the media program may also be replaced with customized vendor messages 808. In some implementations, the social media playback system 100 (FIG. 1) is provided information about advertisements shown during a media program (e.g., provided information by a media provider 120 as shown in FIG. 1), and the social media playback system 100 uses the provided information to determine an advertisement to display in the advertisement area 804 that is related to the advertisement shown in the media viewing pane 802.

Figure 9:
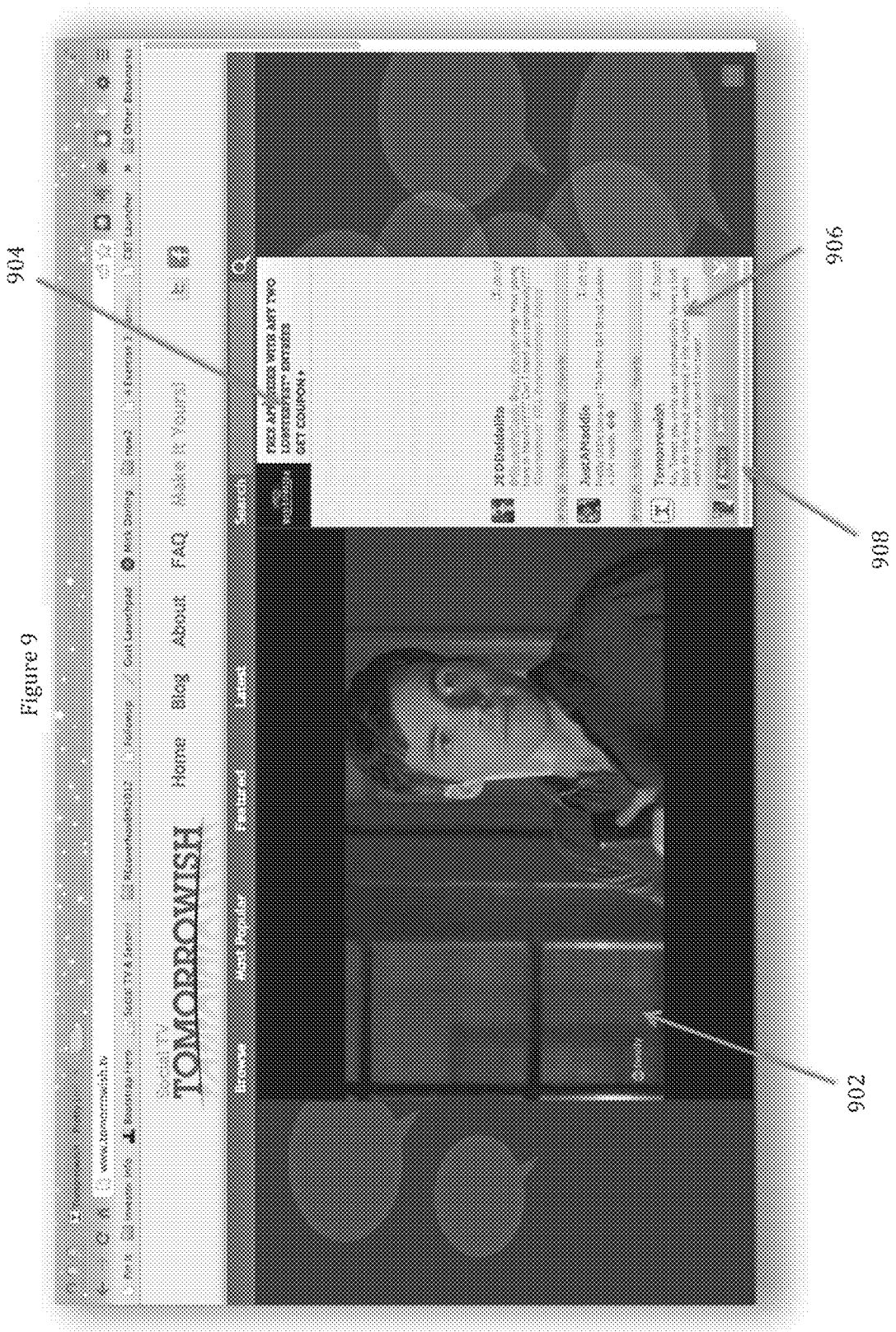

FIG. 9 shows another view of the user interface 600. In this view, the media program has resumed playing in the media viewing pane 902. As a result, the advertisement area 904 retracts as the social media pane 906 expands. Elements of social media content pertaining to the media program being played also re-appear in the social media pane 906, together with the buttons 908 for signing in to another social network or joining in the current social media discussion.

Figure 10:
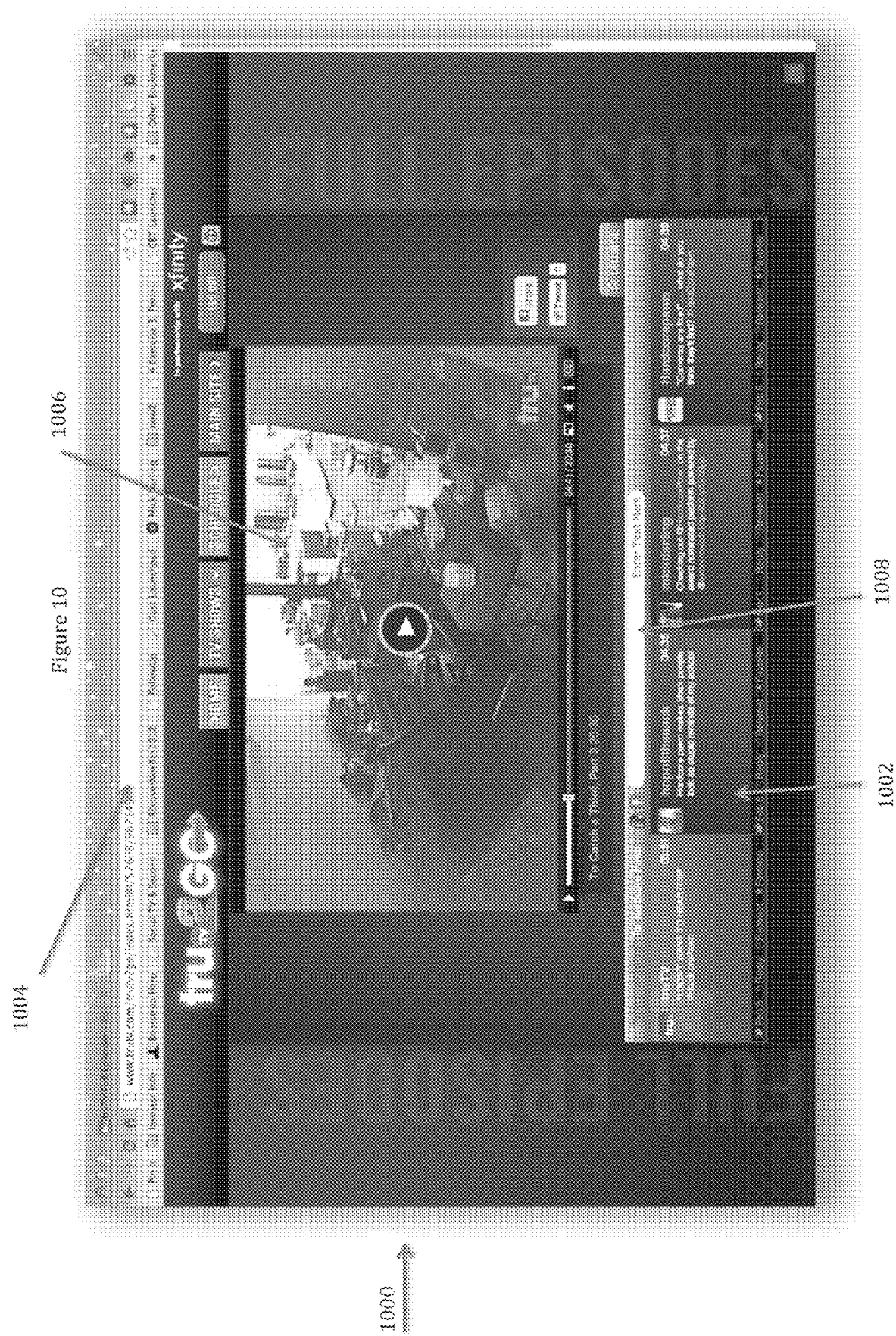

FIG. 10 shows an example user interface 1000 of the social media playback system 100 (FIG. 1). For example, this user interface 1000 may be an example of the user interface 116 shown in FIG. 1. In this user interface 1000, a horizontal social media pane 1002 is embedded into a main web page 1004 and appears below the media viewing pane 1006. While the media program is being played, elements of social media content related to the segment of the media program being watched move across the social media pane 1002 from right to left. Users wishing to participate in the social media discussion can enter their own messages in the text area 1008.

Figure 11:
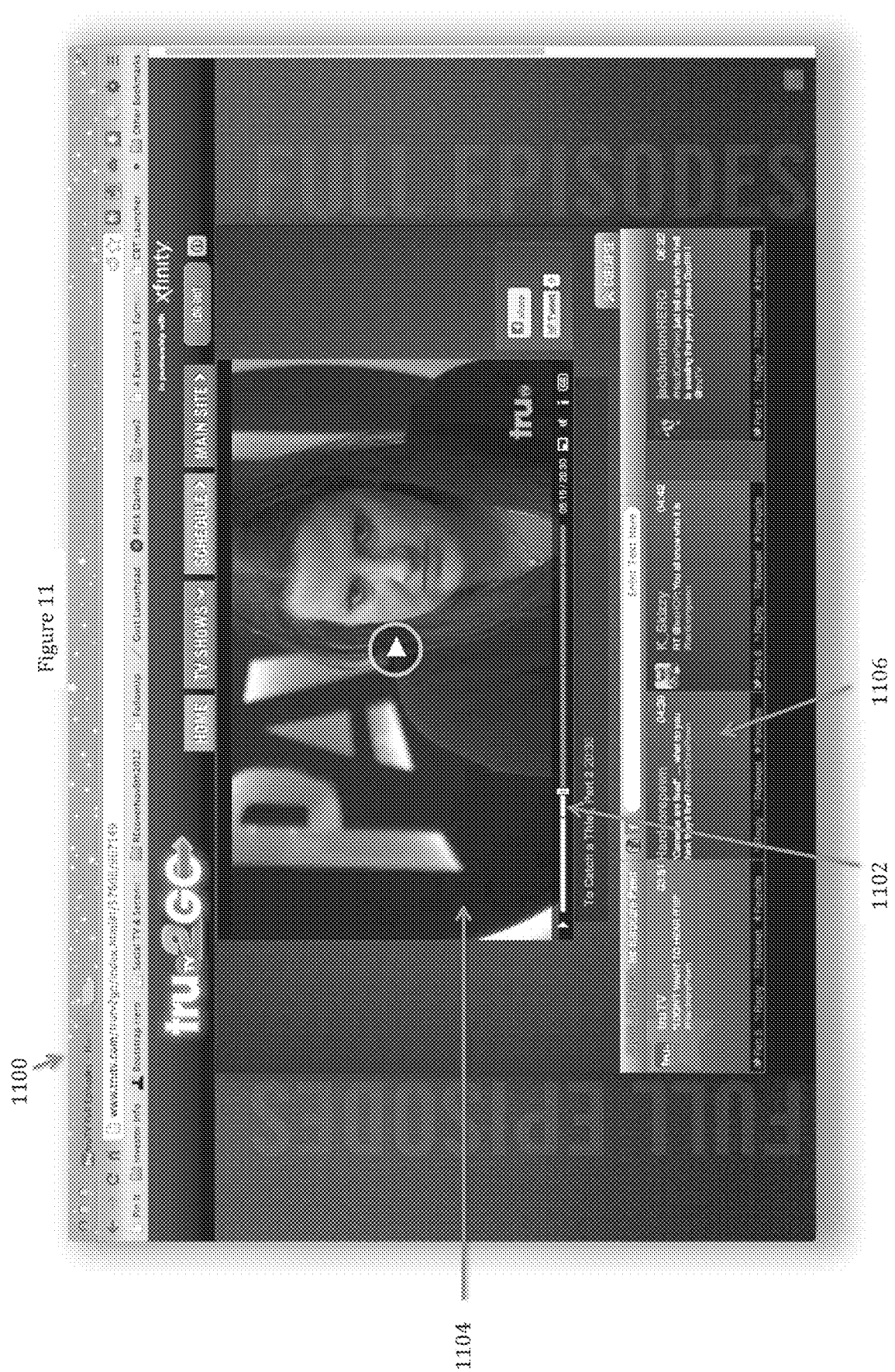

FIG. 11 shows techniques in which the social media playback system 100 (FIG. 1) automatically synchronizes social media content to the progress of the relevant media program being viewed. In this view 1100, a viewer of the media program has used the sliding bar 1102 in the media viewing pane 1104 to fast-forward (e.g., shift in time) to time index 06:19 of the media program. As a result, the social media pane 1106 now shows a social media message created by another viewer while watching the 06:22 segment of the media program. Content shown in the social media pane 1106 is synchronized to the segment of the media program to which the user has shifted to. For example, the content shown in the social media pane 1106 may be associated with an offset of approximately 06:22, indicating that the content was posted approximately 06:22 after the start of the media program and indicating that the content should be played back at approximately 06:22 after the start of the media program.

Figure 12:
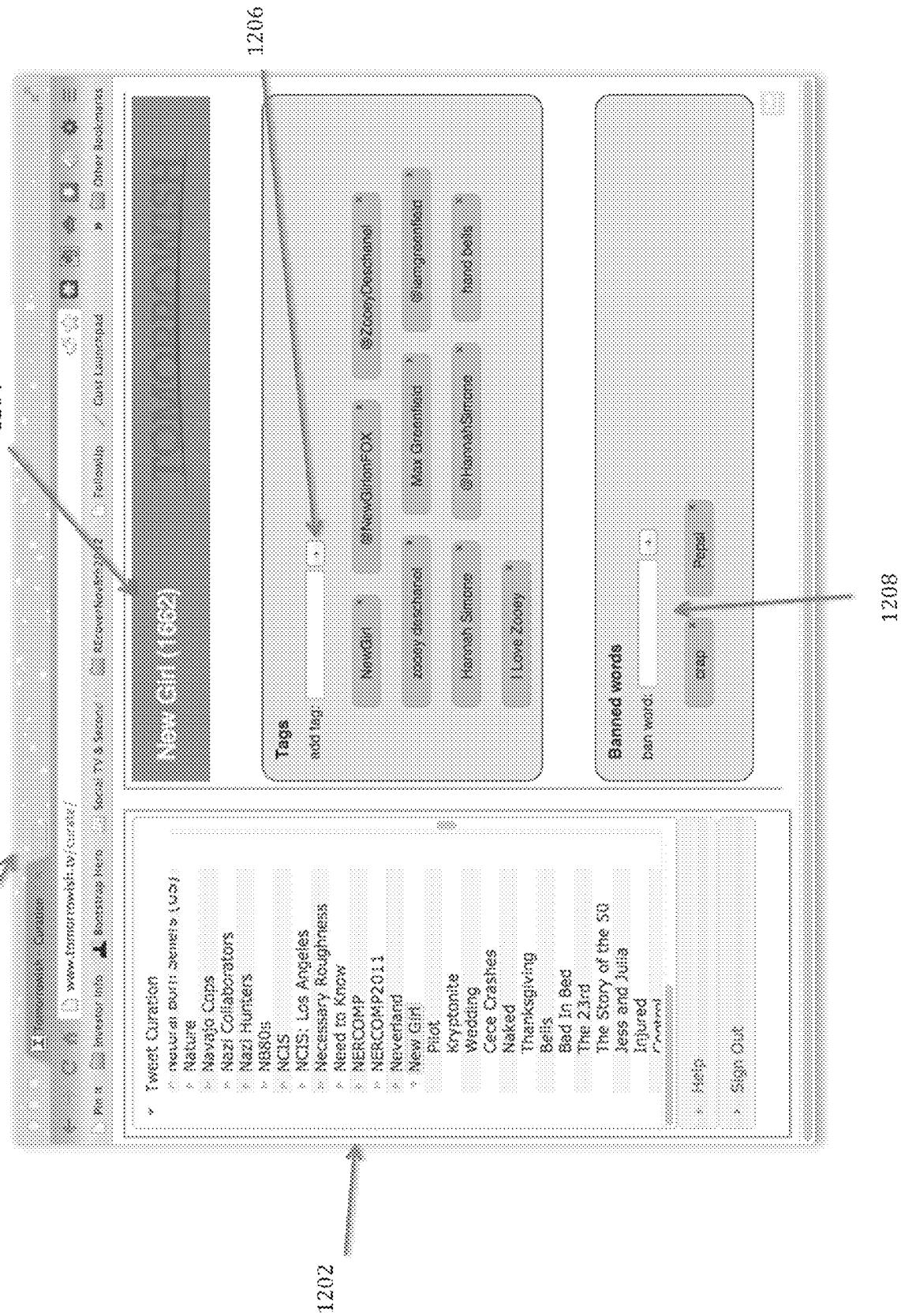

FIG. 12 shows an example user interface 1200 for accessing one functional area of a curation tool (e.g., user interface 116 shown in FIG. 1). An authorized user (e.g. a user 118 authorized by a media provider 120 as shown in FIG. 1, who could be, for example, the producer of a TV program) can use this interface 1200 to instruct the social media playback system 100 to search and capture social media messages that contain particular tags (which can be, for example, keywords). For example, an authorized user can use a series and episode selection drop-down 1202 to select an episode of the TV program. Upon the selection, the user interface 1200 displays the name and program id of the selected episode in the program information area 1204. The user then enters a new tag (e.g., keyword to be used in keyword data 218 as shown in FIG. 2) using a text field 1206. Once saved, the tag appears below the text field 1206 from where it can be later removed by an authorized user. Using a similar mechanism, an authorized user can ban social media messages that contain particular tags. The user accomplishes this task by specifying the banned words in the banned words text area 1208, in the same way as specifying tags. Banned words can be later removed just like removing tags. In some examples, the social media playback system 100 (FIG. 1) can automatically identify elements of social media content containing banned words and mark them as rejected in a database, e.g., the database 300 shown in FIG. 3.

Figure 13:
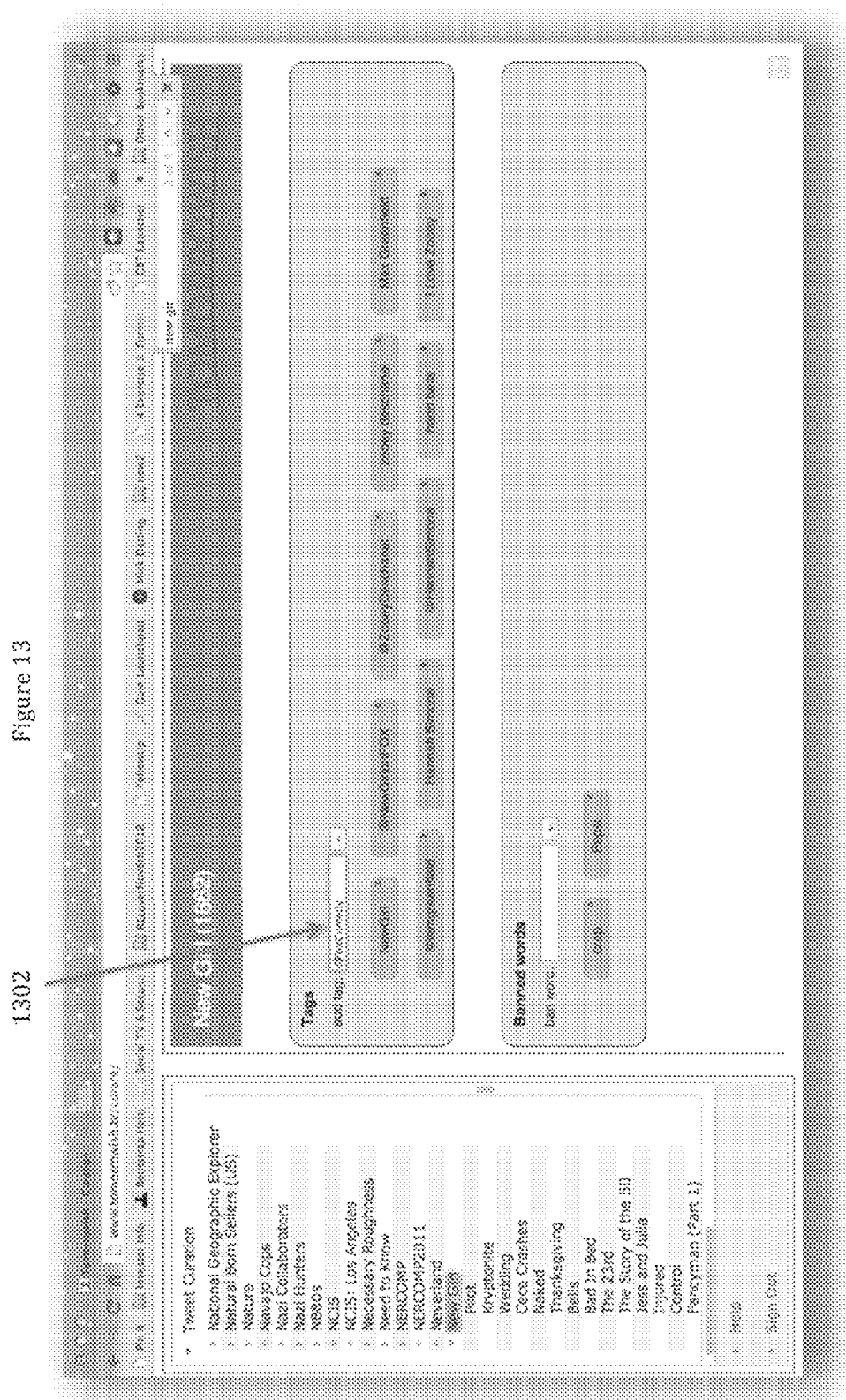

FIG. 13 shows another view of the user interface 1200. In this view, an authorized user of the user interface 1200 has entered a new tag "@FoxComedy" in the text field 1302. Here, the tag can represent a user associated with the media program. For example, the user may be a user identified by the user data 220 shown in FIG. 2.

Figure 14:
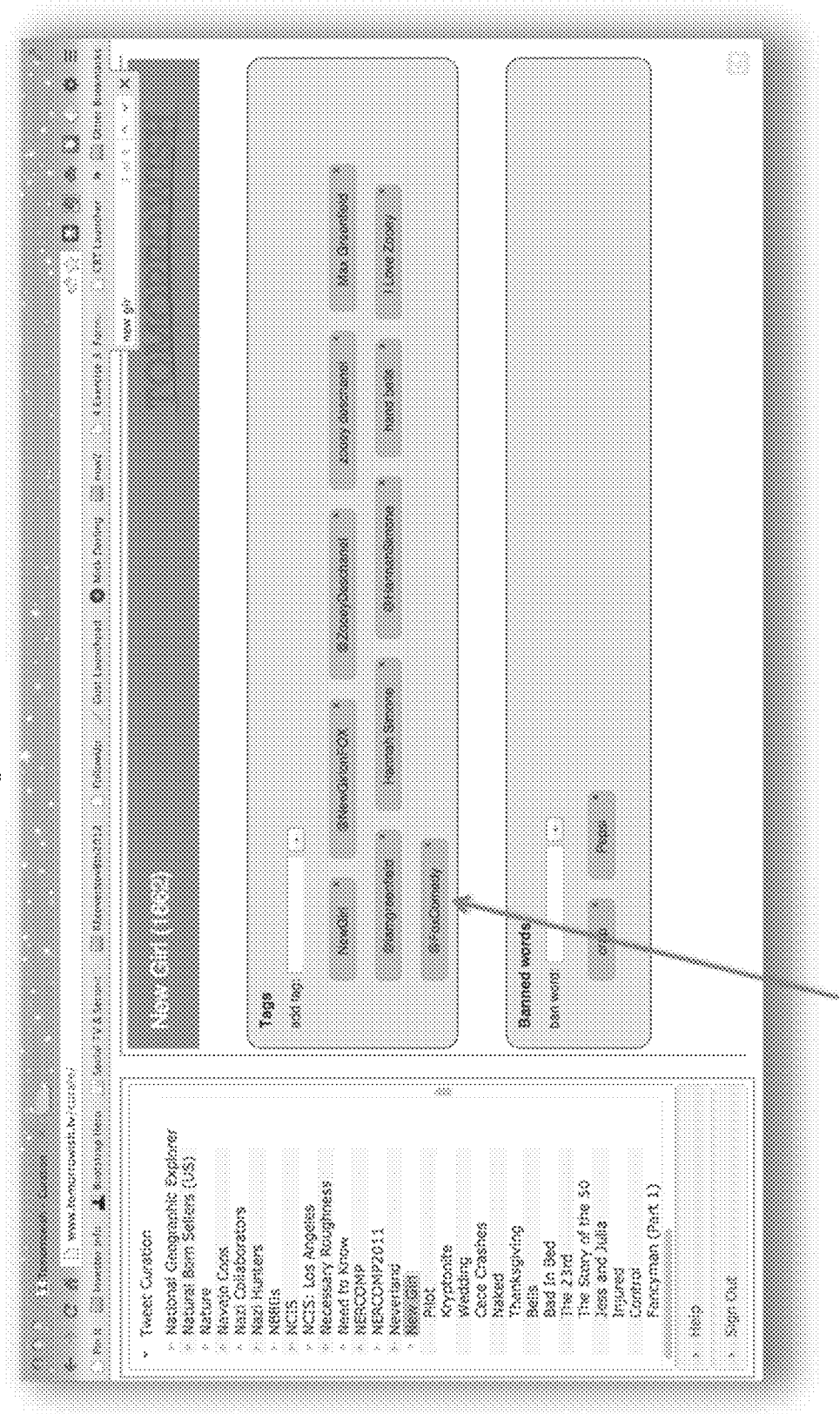

FIG. 14 shows another view of the user interface 1200. In this view, the newly added tag 1402 "@FoxComedy" has appeared in a tag list.

Figure 15:
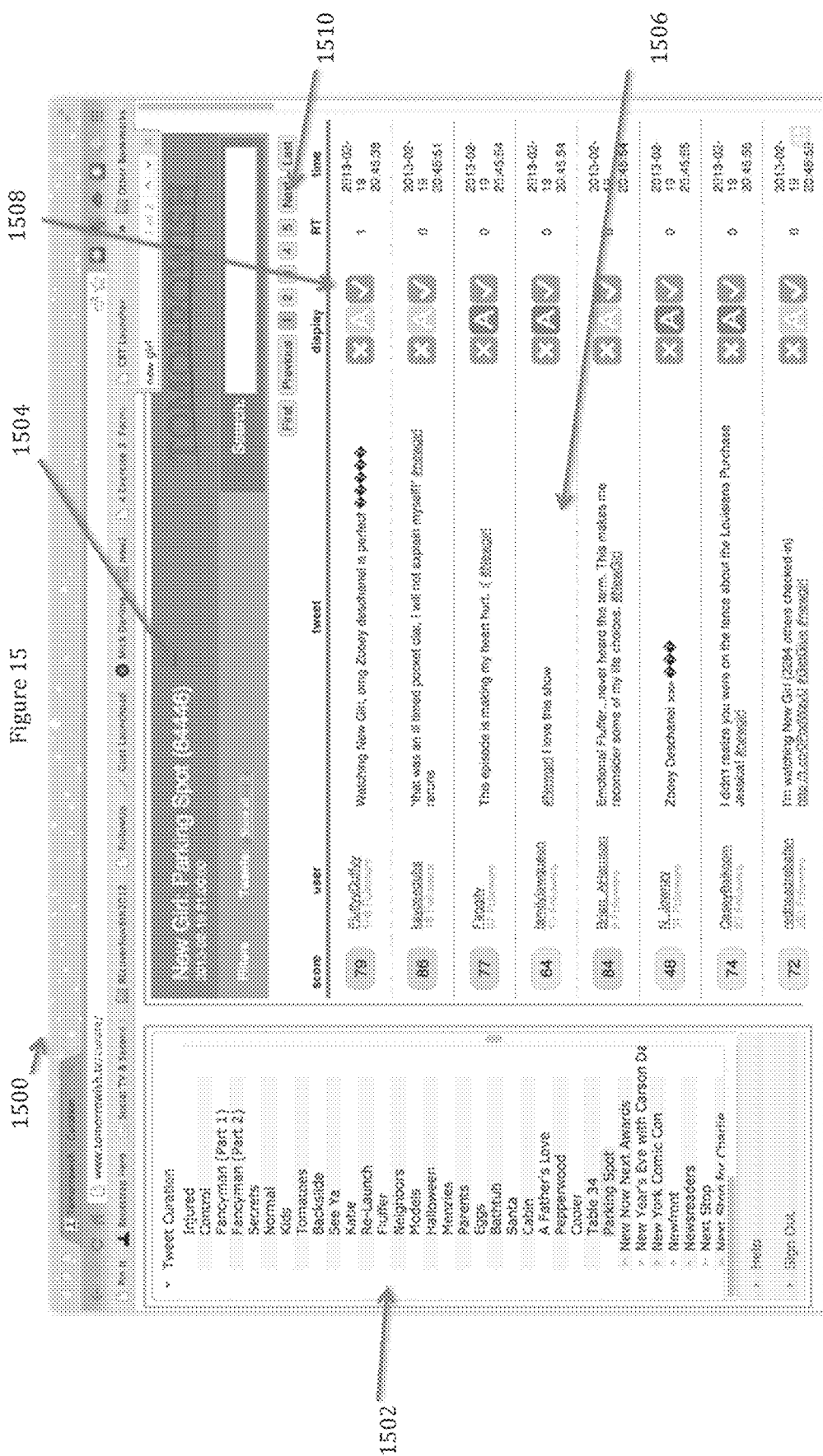

FIG. 15 shows an example user interface 1500 for accessing another functional area of a curation tool. An authorized user can use this interface 1500 to monitor and manipulate elements of social media content relevant to the media program. For example, a TV program producer can use a series and episode selection drop-down 1502 to select an episode of the TV program. Upon the selection, the user interface 1500 displays the name and program id of the selected episode in the program information area 1504. The user interface 1500 also displays social media content pertaining to the selected media program in a social media pane 1506. Information such as score, creator, tweet, display option, number of re-tweet, and creation time may be included. The display option column 1508 shows the current display setting for each social media element. The display setting may be "automatically accepted" or "automatically rejected," which indicate, respectively, the social media playback system 100 has automatically determined whether to show or hide a social media message, for example, based on keywords associated with the message, a user associated with the message, a relevance of the message, or other factors. An authorized user can also manually accept or reject a social media message, thus overriding the automatic display setting for that message. When the number of social media messages pertaining to the media program exceeds one page, an authorized user can navigate the messages via a navigation mechanism such as navigation buttons 1510.

Figure 16:
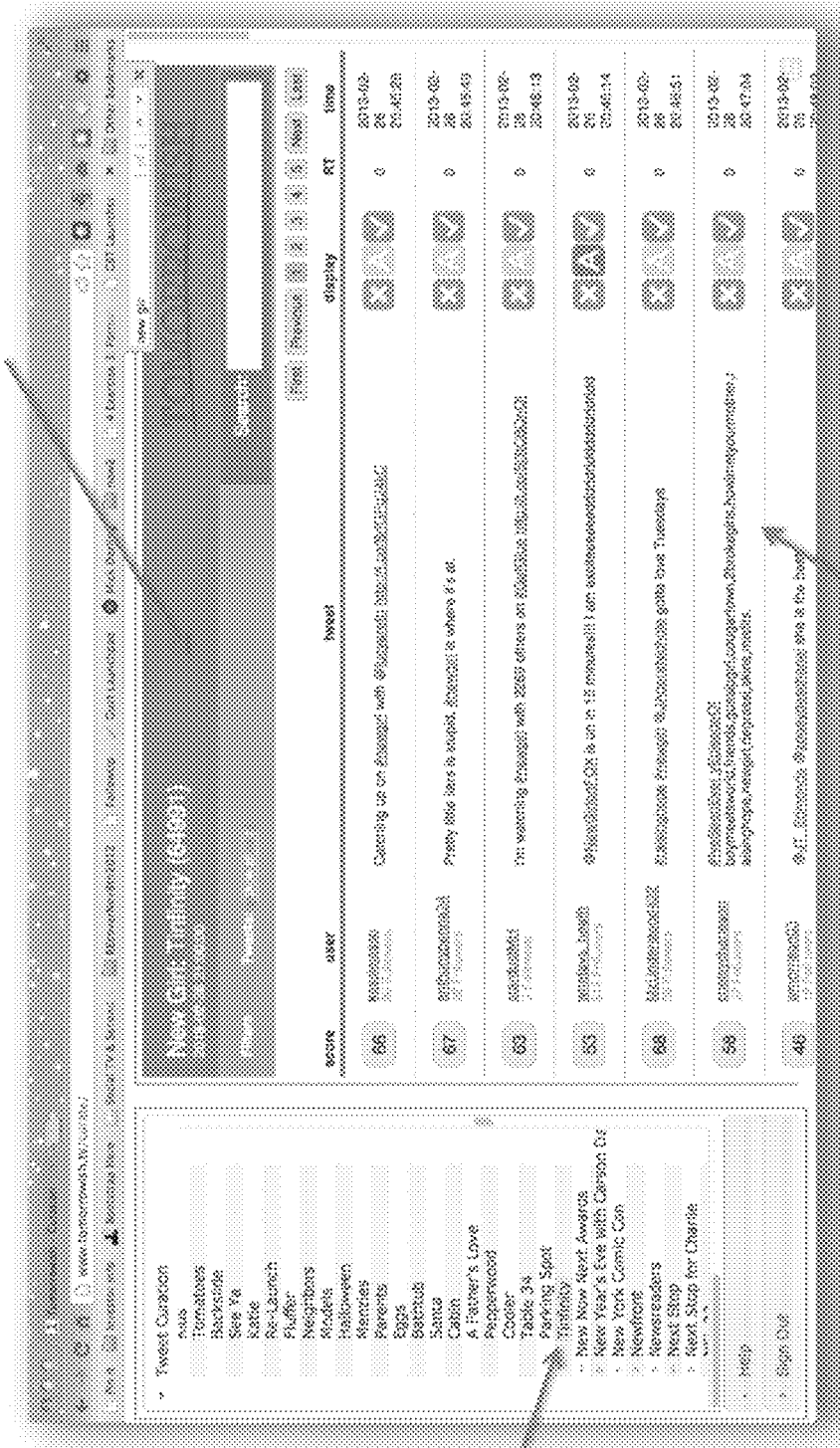

FIG. 16 shows another view of the user interface 1500. In this view, an authorized user has selected a different episode of the relevant media program from the series and episode selection drop-down 1602. As a result, the program information area 1604 now shows the newly selected media program. The social media pane 1606 is also updated with elements of social media content pertaining to the new episode.

Figure 17:
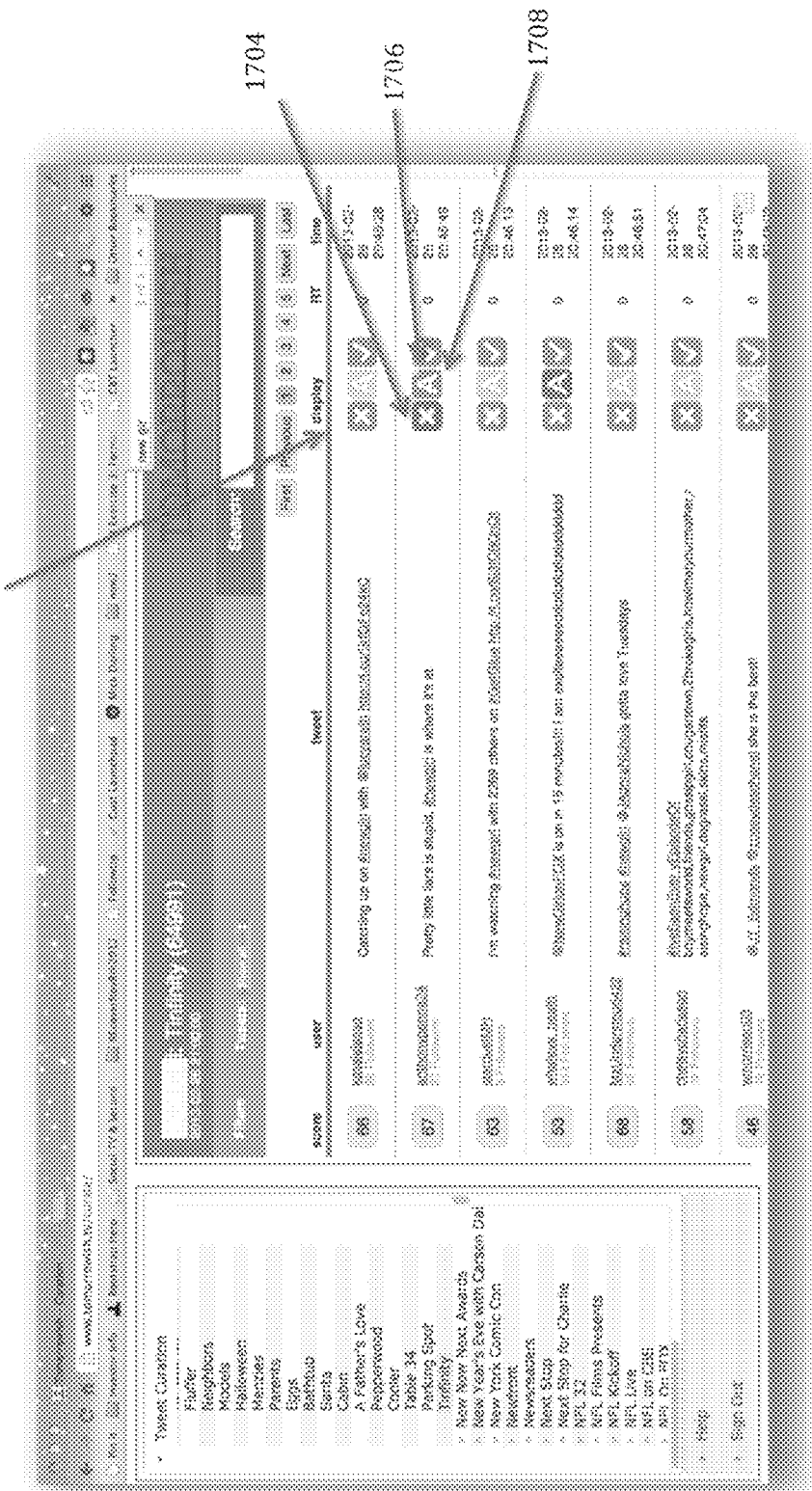
Figure 18:
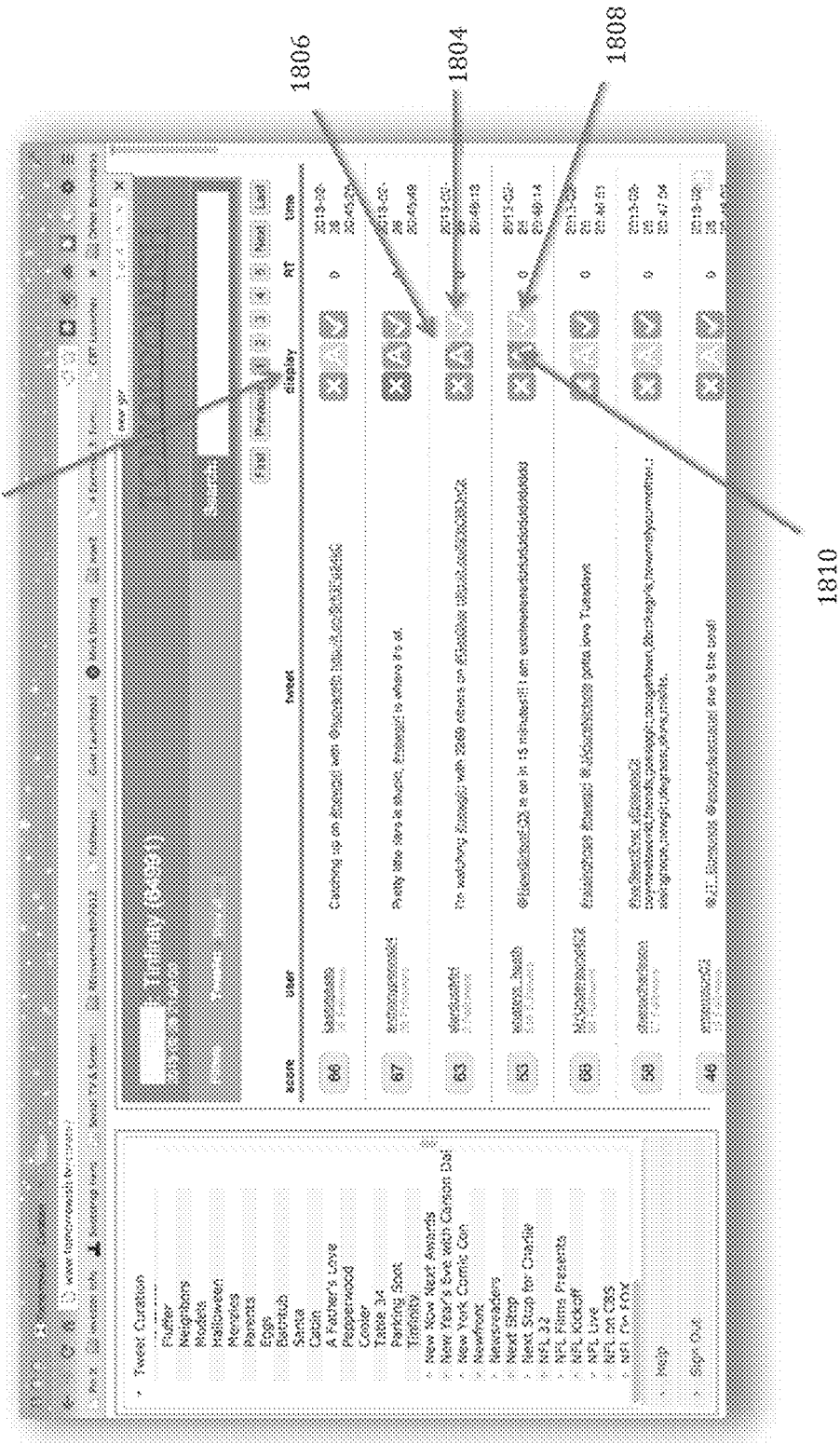

FIG. 17 shows another view of the user interface 1500. In this view, an authorized user has manually rejected a social media message (the second message from the top) that had an "automatically accepted" display setting. The display column 1702 shows a red "X" mark 1704 on the left indicating that the message is rejected; a small green check mark 1706 appears on the corner of the grayed-out letter "A" 1708 in the middle, reminding the user that the social media message had an "automatically accepted" setting that was overridden FIG. 18 shows another view of the user interface 1500. In this view, an authorized user has manually accepted two social media messages (the third and the fourth message from the top). For the third message, the display column 1802 shows a big green check mark 1804 on the right and a small green check mark 1806 on the corner of the grayed-out letter "A" in the middle. This indicates that the message had an "automatically accepted" setting and is also manually accepted. For the fourth message, the display column 1802 shows a big green check mark 1808 on the right and a small red "X" 1810 on the corner of the grayed-out letter "A" in the middle. This indicates that the message had an "automatically rejected" setting but is now manually accepted.

Figure 19:
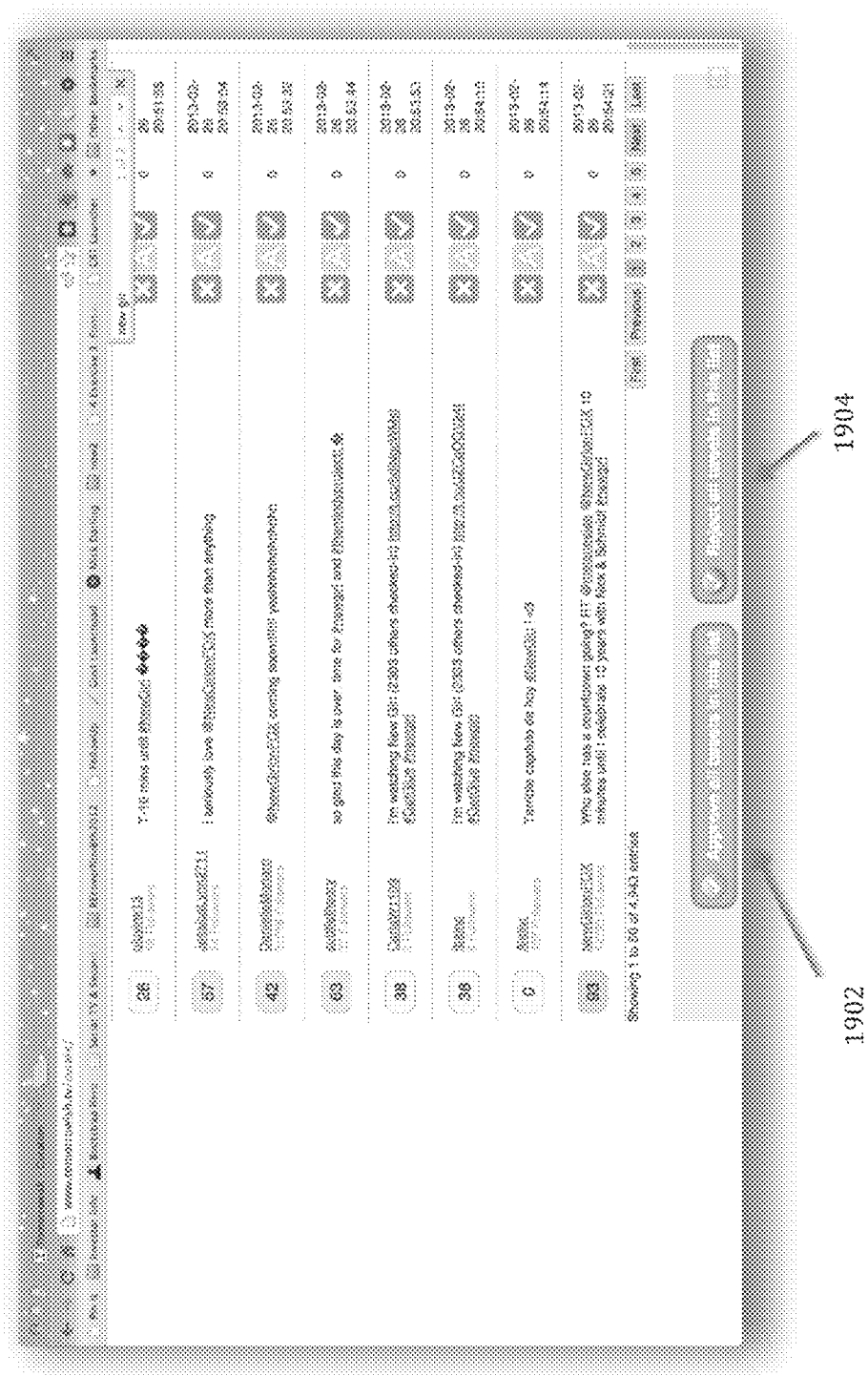

FIG. 19 shows another view of the user interface 1500. This view illustrates how an authorized user can accept or reject a whole page of social media content pertaining to a media program without having to navigate through each individual element. In this view, an authorized user has scrolled all the way down to the bottom of the screen. Two buttons are presented: an "Approve all tweets in the list" button 1902 and a "Reject all tweets in this list" button 1904. An authorized user can use the "Approve all" button 1902 to accept the entire page of social media content. Or, the user can use the "Reject all" button 1904 to prevent the entire page of social media content from being shown. In some examples, the social media playback system 100 (FIG. 1) can record information about approved and rejected content in a database, e.g., the database 300 shown in FIG. 3.

Figure 20:
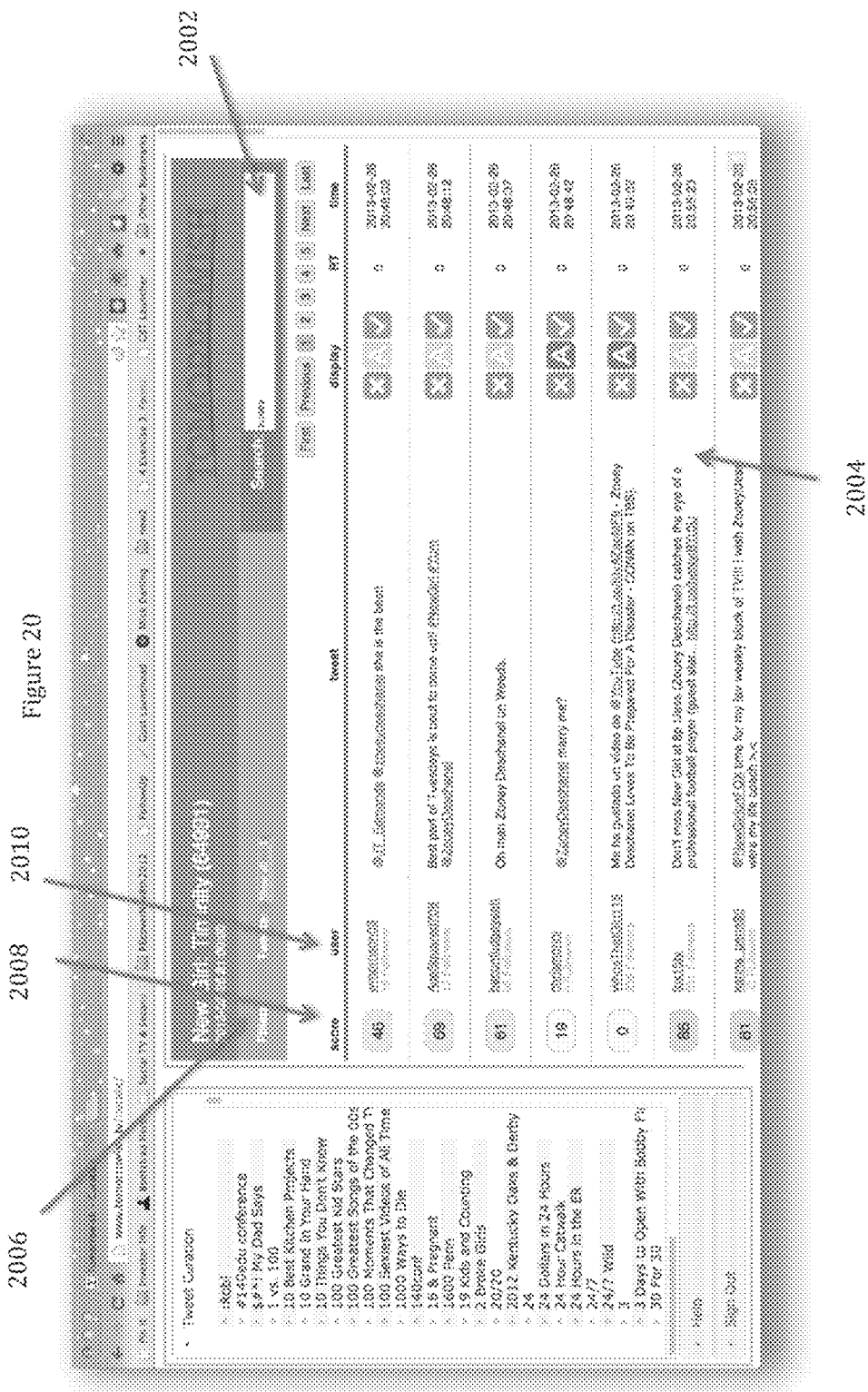

FIG. 20 shows another view of the user interface 1500. The view illustrates how an authorized user of the curation tool can search, filter, and sort social media content. In this view, an authorized user has entered a keyword, "zooey", in the search area 2002 to instruct the social media playback system 100 to retrieve social media content containing that keyword. As a result, the social media pane 2004 displays only elements of social media content that have the specified keyword. An authorized user can also search for specific social media content by applying a filter. In the example shown here, an authorized user has specified the "show all" option in the filter selection area 2006. This option imposes no limits to what the social media playback system 100 may return. Once the search results are obtained, the authorized user can sort them based on particular field values. For example, the authorized user may click the "score" column header 2008 to sort the results by "score." Alternatively, the user may click the "user id" column 2010 to sort by user id.

Figure 21:
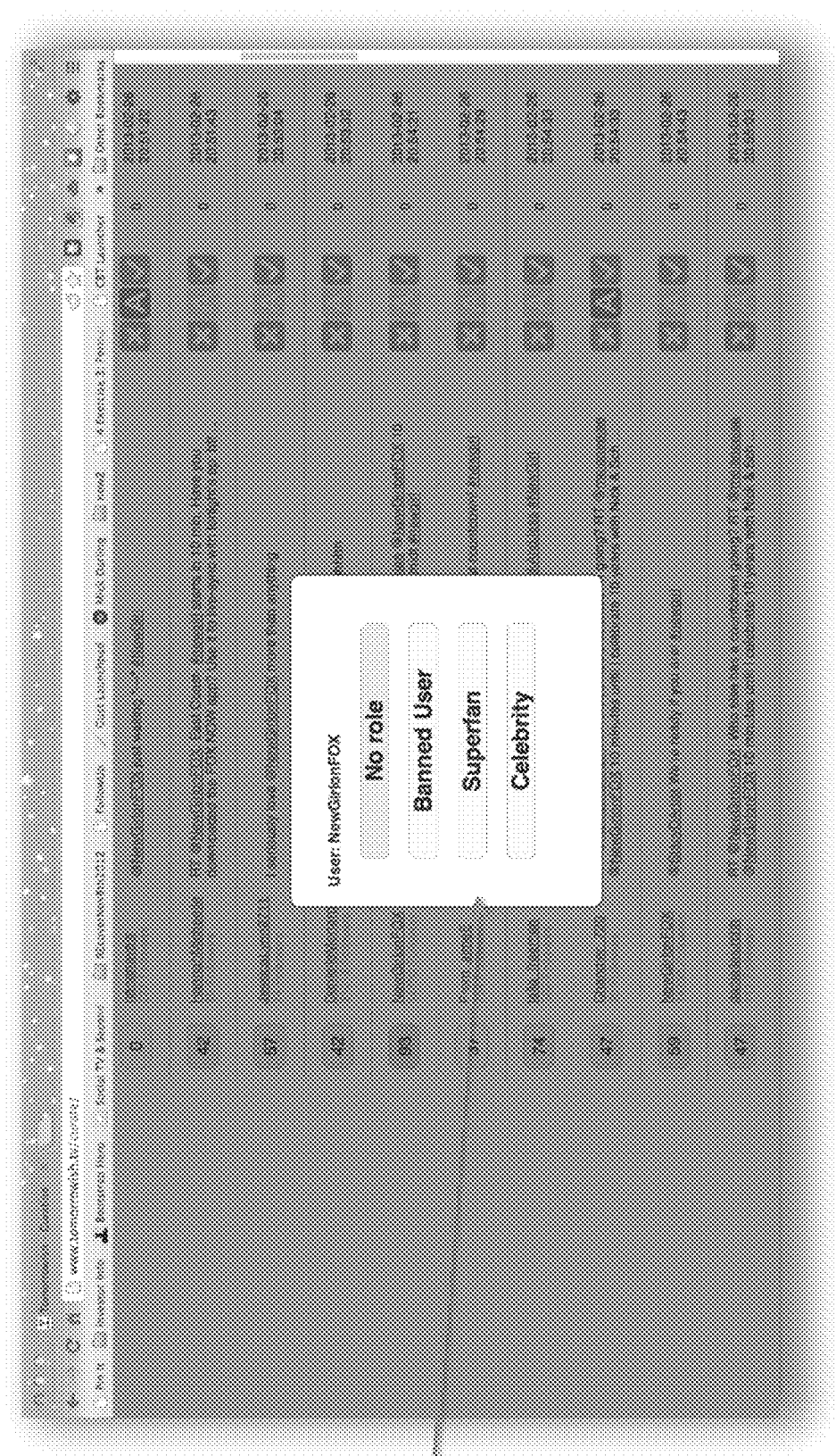

FIG. 21 illustrates how an authorized user of the user interface can utilize user roles to assign different priorities to the messages of social media participants. Having a higher priority ensures that a participant's social media messages are shown above those of a low-priority participant. In this example, an authorized user has selected a participant named NewGirlonFOX from the user interface 1500. The selection has brought up a pop-up box 2100, displaying four exemplary user roles: No role, Banned User, Superfan, and Celebrity. The "No role" option is the default option for all social media users in the present exemplary implementation. This option conveys no special priority. The "Banned User" role, when applied, prevents a social media participant's messages from being seen by other participants. The "Superfan" role gives a participant's social media messages higher priority than those of a "No role" user. For example, the social media playback system 100 can choose a social media message of a "Superfan" user to display instead of a social media message of a "No Role" user, for example, if the social media playback system 100 is choosing between two messages to display at a time at which only one can be displayed. The "Celebrity" role is reserved for those participants who are associated with the relevant media program. For instance, an actor who plays a role in the media program can have a "Celebrity" role. A "Celebrity" participant's social media entries may have the highest priority and may be shown in place non-celebrity participants' entries (e.g., if the social media playback system 100 chooses one entry among two entries that could be shown at a particular time). In some examples, a social media message posted by a user in the "Celebrity" role may be highlighted or otherwise indicated when the social media message is displayed in a stream of social media content associated with the media program. In the example here, the pop-up box 2100 shows that NewGirlonFOX has been given the default role of "No role."

Figure 22:
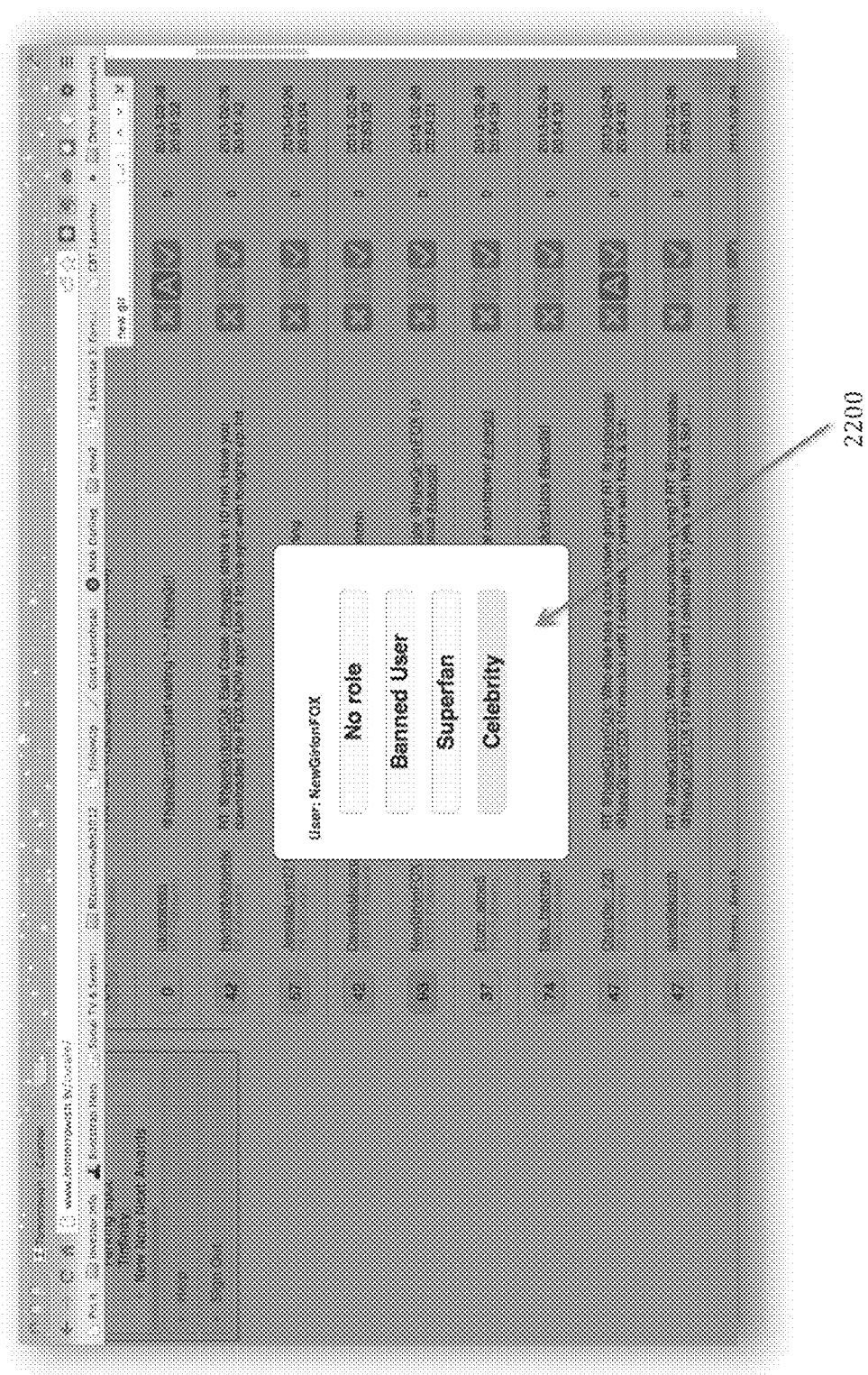

FIG. 22 shows another view of the pop-up box 2100. Here, NewGirlonFOX's role has been changed to "Celebrity" in the pop-up box 2200.

Figure 23:
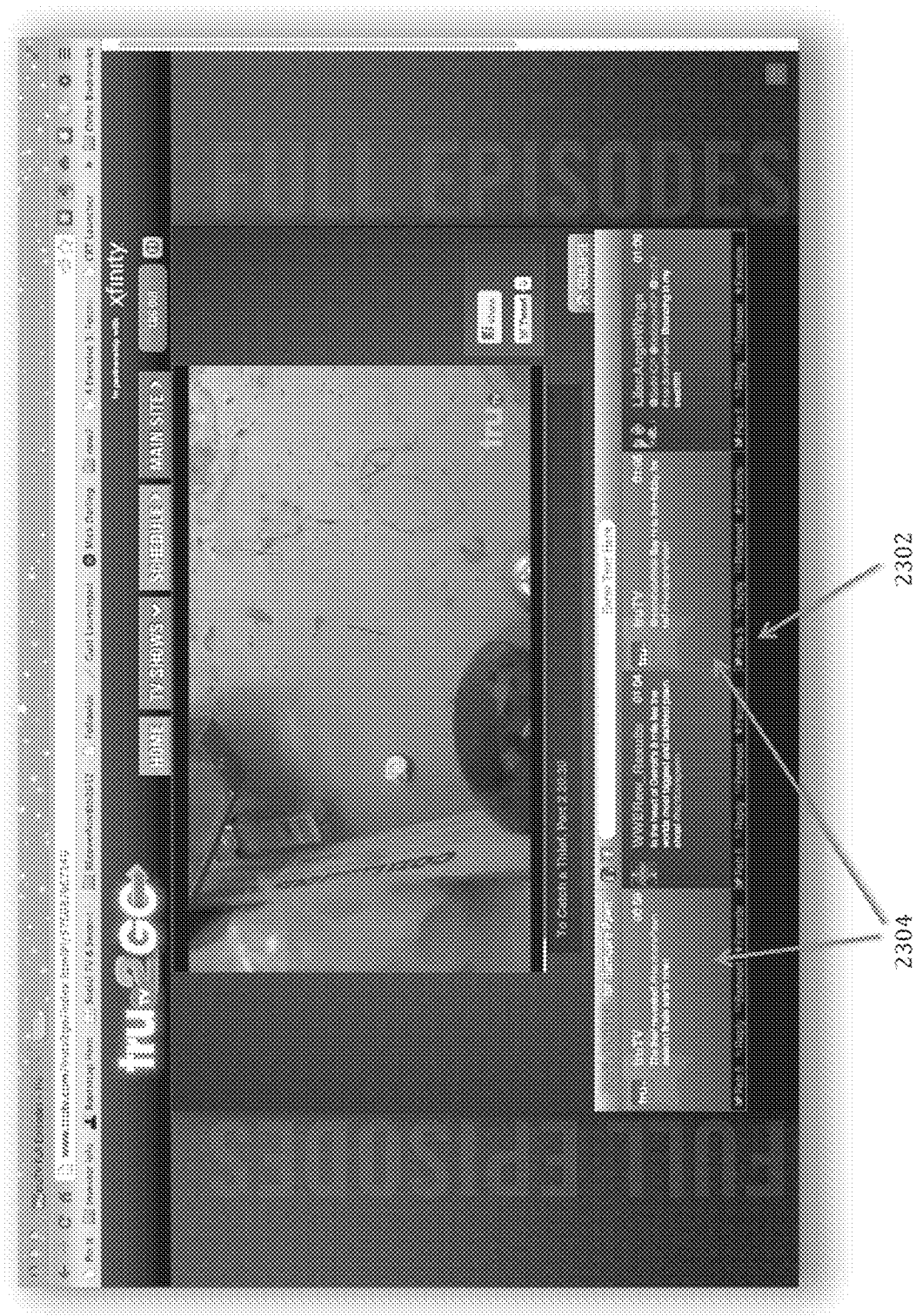

FIG. 23 illustrates the effect of use roles on the display of social media messages. The social media pane 2302 shows two messages 2304 created by users of "Celebrity" role. Because of the high priority assigned to Celebrity users, the two messages 2304 stick to the left hand side as the social media stream moves right to left, until the next "Celebrity" message pushes the previous one off the social media pane 2302. For example, the messages 2304 may have been identified as exceptional messages 318 (FIG. 3) by the social media playback system 100.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A method comprising:
  accessing, from one or more memories on one or more computers and by a harvester module implemented on one or more computers that selects a subset of elements of social media that are each associated with a media program and have a higher priority than other messages associated with the media program for transmission to a device to cause synchronized presentation of the subset of elements of social media with the media program, social media content i) that comprises elements of social media each of which include one or more terms that comprise a portion of the respective element of social media, ii) associated with the media program at least a portion of which has been presented, at least one of the terms for each of the elements of social media identified as relevant to the media program and iii) associated with data indicating timing information that represents a time for presentation of a respective element of social media in connection with a presentation of the media program; and during a presentation of the media program and by the harvester module:
  for at least one of the elements of social media:
    determining, for at least some of the terms of the element of social media, a frequency of the respective term across multiple elements of social media associated with the media program in the one or more memories, wherein at least one of the terms is identified as relevant to the media program,
    determining an importance value for at least some of the terms of the element of social media, the importance value indicating the importance of the respective term to the media program,
    based on the determined frequency and importance values for the at least some of the terms of the element of social media, determining a frequency value for the element of social media,
    determining one or more weights for the element of social media, and
    determining a score for the element of social media by combining the frequency value and the weights;
  determining, using the social media content in the one or more memories, a plurality of elements of social media that each have timing information that indicate a time for presentation of the respective element of social media during a current timeframe of the presentation of the media program;
  selecting, for presentation on a display and from the plurality of elements of social media, one or more elements of social media that each have a respective score that is greater than other scores for other elements of social media that are not selected; and
  in response to selecting the one or more elements of social media that each have a respective score that is greater than other scores for other elements of social media and based on the respective timing information, transmitting, using a network, the one or more elements of social media to the device to cause presentation of the one or more elements of social media on a display during the presentation of the media program.

2. The method of claim 1 wherein determining the frequency comprises determining, for at least some of the terms of the element of social media, the frequency according to a total number of elements of social media associated with the media program and a number of elements of social media that contain the term.

3. The method of claim 1 wherein determining the frequency comprises determining, for at least some of the terms of the element of social media, the frequency of the terms according to the formula log 2(M/T), wherein log 2 is the logarithm base 2 function, M is a total number of elements of social media associated with the media program, and T is a number of elements of social media that contain the term.

4. The method of claim 1 further comprising separating, for the at least one of the elements of social media, the element of social media into words, wherein the terms comprise the words.

5. The method of claim 4 wherein determining the frequency comprises determining, for at least some of the terms of the element of social media, a frequency of at least one of the words based on a database that stores words and their associated frequencies.

6. The method of claim 1 wherein determining the score for the element of social media by combining the frequency value and the weights comprises determining the score at least in part by multiplying the frequency value by one or more of the weights.

7. The method of claim 1 further comprising increasing the score based on the presence of one or more keywords in the element of social media, the keywords stored in a keyword database.

8. The method of claim 1 further comprising calculating a score of zero for the element of social media based on a weight determined by the presence of banned words in the element of social media.

9. The method of claim 1 wherein determining the one or more weights for the element of social media comprises:
  determining if the element of social media is associated with at least a threshold number of search terms, and
  assigning, to the element of social media, a weight that increases the score for the element of social media relative to other elements of social media that are not associated with at least the threshold number of search terms.

10. The method of claim 1 wherein determining the one or more weights for the element of social media comprises determining at least one weight based on a number of reposts of the element of social media.

11. The method of claim 1 wherein determining the one or more weights for the element of social media comprises determining at least one weight based on a number of affirmations of the element of social media.

12. The method of claim 1 wherein determining the one or more weights for the element of social media comprises determining at least one weight based on a popularity of a user associated with the element of social media.

13. The method of claim 1 wherein determining the one or more weights for the element of social media comprises determining at least one weight based on a URL contained in the element of social media.

14. The method of claim 1 further comprising normalizing the determined scores for the elements of social media.

15. The method of claim 14 wherein normalizing the scores comprises converting the scores to a range from 0 to 1.

16. The method of claim 1 further comprising
  determining, based on the respective scores of the elements of social media, at least some of the elements of social media to include in a stream of social media, and
  displaying, on a user interface presented on the display, at least some of the determined elements of social media concurrently with the media program.

17. The method of claim 16, wherein the at least some of the elements of social media are determined based on an identity of a user associated with the stream of social media.

18. A computer readable storage device storing a computer program product comprising machine readable instructions that, when executed, cause a harvester module implemented on one or more computers to carry out operations comprising:

accessing, from one or more memories on one or more computers and by the harvester module that selects a subset of elements of social media that are each associated with a media program and have a higher priority than other messages associated with the media program for transmission to a device to cause synchronized presentation of the subset of elements of social media with the media program, social media content i) that comprises elements of social media each of which include one or more terms that comprise a portion of the respective element of social media, ii) associated with the media program at least a portion of which has been presented, at least one of the terms for each of the elements of social media identified as relevant to the media program and iii) associated with data indicating timing information associated with that represents a time for presentation of a respective element of social media in connection with a presentation of the media program; and during a presentation of the media program and by the harvester module:

for at least one of the elements of social media:

determining, for at least some of the terms of the element of social media, a frequency of the respective term across multiple elements of social media associated with the media program in the one or more memories, wherein at least one of the terms is identified as relevant to the media program, determining an importance value for at least some of the terms of the element of social media, the importance value indicating the importance of the respective term to the media program, based on the determined frequency and importance values for the at least some of the terms of the element of social media, determining a frequency value for the element of social media, determining one or more weights for the element of social media, and determining a score for the element of social media by combining the frequency value and the weights;

determining, using the social media content in the one or more memories, a plurality of elements of social media that each have timing information that indicate a time for presentation of the respective element of social media during a current timeframe of the presentation of the media program;

selecting, for presentation on a display and from the plurality of elements of social media, one or more elements of social media that each have a respective score that is greater than other scores for other elements of social media that are not selected; and in response to selecting the one or more elements of social media that each have a respective score that is greater than other scores for other elements of social media and based on the respective timing information, transmitting, using a network, the one or more elements of social media to the device to cause presentation of the one or more elements of social media on a display during the presentation of the media program.

19. A system comprising:

a harvester module implemented on one or more computers that selects a subset of elements of social media that are each associated with a media program and have a higher priority than other messages associated with the media program for transmission to a device to cause synchronized presentation of the subset of elements of social media with the media program, the harvester module configured to perform operations comprising:

accessing, from one or more memories on one or more computers, social media content i) that comprises elements of social media each of which include one or more terms that comprise a portion of the respective element of social media, ii) associated with the media program at least a portion of which has been presented, at least one of the terms for each of the elements of social media identified as relevant to the media program and iii) associated with data indicating timing information that represents a time for presentation of a respective element of social media in connection with a presentation of the media program; and during a presentation of the media program:

for at least one of the elements of social media:

determining, for at least some of the terms of the element of social media, a frequency of the respective term across multiple elements of social media associated with the media program in the one or more memories, wherein at least one of the terms is identified as relevant to the media program, determining an importance value for at least some of the terms of the element of social media, the importance value indicating the importance of the respective term to the media program, based on the determined frequency and importance values for the at least some of the terms of the element of social media, determining a frequency value for the element of social media, determining one or more weights for the element of social media, and determining a score for the element of social media by combining the frequency value and the weights;

determining, using the social media content in the one or more memories, a plurality of elements of social media that each have timing information that indicate a time for presentation of the respective element of social media during a current timeframe of the presentation of the media program;

selecting, for presentation on a display and from the plurality of elements of social media, one or more elements of social media that each have a respective score that is greater than other scores for other elements of social media that are not selected; and in response to selecting the one or more elements of social media that each have a respective score that is greater than other scores for other elements of social media and based on the respective timing information, transmitting, using a network, the one or more elements of social media to the device to cause presentation of the one or more elements of social media on a display during the presentation of the media program.

20. The method of claim 1, wherein transmitting, during the presentation of the media program and using the network, the one or more elements of social media to the device comprises transmitting, during a broadcast of the media program and using the network, the one or more elements of social media to the device to cause presentation of the one or more elements of social media on the display during the broadcast of the media program.

21. The method of claim 1, wherein determining the plurality of elements of social media comprises determining two or more elements of social media that each have timing information that indicate a time for presentation of the respective element of social media during a current timeframe of the presentation of the media program, at least one of the two or more elements of social media from a first presentation of the media program and at least one of the two or more elements of social media from a second presentation of the media program that is a different presentation than the first presentation of the media program.

22. The method of claim 1, wherein determining the plurality of elements of social media comprises determining, from all of the elements of social media associated with the media program, a proper subset of elements of social media that each have timing information that indicate a time for presentation of the respective element of social media during the current timeframe of the presentation of the media program.

* * * * *

UNITED STATES PATENT AND TRADEMARK OFFICE
CERTIFICATE OF CORRECTION

PATENT NO. : 10,614,074 B1
APPLICATION NO. : 14/318294
DATED : April 7, 2020
INVENTOR(S) : Darling et al.

Page 1 of 1

It is certified that error appears in the above-identified patent and that said Letters Patent is hereby corrected as shown below:

In the Claims

Column 27, Line 19, Claim 18, after "information" delete "associated with"

Signed and Sealed this
Fourth Day of August, 2020

Andrei Iancu
*Director of the United States Patent and Trademark Office*